(12) United States Patent
Tang et al.

(10) Patent No.: US 10,409,642 B1
(45) Date of Patent: Sep. 10, 2019

(54) CUSTOMER RESOURCE MONITORING FOR VERSATILE SCALING SERVICE SCALING POLICY RECOMMENDATIONS

(71) Applicant: Amazon Technologies, Inc., Seattle, WA (US)

(72) Inventors: Kai Fan Tang, Port Coquitlam (CA); Ahmed Usman Khalid, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/359,535

(22) Filed: Nov. 22, 2016

(51) Int. Cl.
 *G06F 9/50* (2006.01)
(52) U.S. Cl.
 CPC .................. *G06F 9/5005* (2013.01)
(58) Field of Classification Search
 CPC ...................................................... G06F 9/5005
 See application file for complete search history.

(56) References Cited

U.S. PATENT DOCUMENTS

| | | | |
|---|---|---|---|
| 7,167,799 B1 | 1/2007 | Dolgov et al. | |
| 7,529,784 B2 | 5/2009 | Kavuri et al. | |
| 7,805,706 B1 | 9/2010 | Ly et al. | |
| 8,484,353 B1 | 7/2013 | Johnson et al. | |
| 8,621,069 B1 | 12/2013 | Tompkins | |
| 8,788,855 B2 | 7/2014 | Cong et al. | |
| 8,978,035 B2 | 3/2015 | McGrath et al. | |
| 9,256,467 B1 | 2/2016 | Singh et al. | |
| 9,405,593 B2 | 8/2016 | McGrath et al. | |
| 9,477,730 B2 | 10/2016 | Liensberger et al. | |
| 2003/0154279 A1 | 8/2003 | Aziz | |
| 2004/0040025 A1 | 2/2004 | Lehtinen | |
| 2006/0136928 A1 | 6/2006 | Crawford et al. | |
| 2006/0168575 A1 | 7/2006 | Bhatt et al. | |
| 2006/0168581 A1 | 7/2006 | Goger et al. | |

(Continued)

FOREIGN PATENT DOCUMENTS

| | | | |
|---|---|---|---|
| JP | 2001134453 A | 5/2001 | |
| JP | 2013543171 A | 11/2013 | |

(Continued)

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.

(Continued)

*Primary Examiner* — Sisley N Kim
(74) *Attorney, Agent, or Firm* — Davis Wright Tremaine LLP

(57) ABSTRACT

A notification for an application stack is received, where the application stack includes a plurality of resource types. At least one policy associated with the notification is obtained, with the first policy being a policy for scaling a first resource of a first resource type and a second resource of a second resource type of the application stack. A first capacity for the first resource and a second capacity for the second resource is determined based at least in part on the at least one policy. The first resource and the second resource are caused to be scaled according to the first capacity and the second capacity respectively.

20 Claims, 10 Drawing Sheets

(56) References Cited

U.S. PATENT DOCUMENTS

| | | | |
|---|---|---|---|
| 2006/0277206 | A1* | 12/2006 | Bailey .................. G06F 11/328 |
| 2007/0118657 | A1 | 5/2007 | Kreitzer et al. |
| 2007/0245331 | A1 | 10/2007 | Daynes et al. |
| 2008/0059972 | A1* | 3/2008 | Ding ....................... G06F 9/505 |
| | | | 718/105 |
| 2008/0109898 | A1 | 5/2008 | Mohammed et al. |
| 2008/0244611 | A1 | 10/2008 | Doyle et al. |
| 2009/0293056 | A1 | 11/2009 | Ferris |
| 2010/0153941 | A1 | 6/2010 | Borissov et al. |
| 2011/0307591 | A1* | 12/2011 | Sugata ............... G06F 11/3495 |
| | | | 709/223 |
| 2012/0233331 | A1 | 9/2012 | Voccio et al. |
| 2012/0233668 | A1 | 9/2012 | Leafe et al. |
| 2013/0191527 | A1 | 7/2013 | Ashok et al. |
| 2013/0227563 | A1 | 8/2013 | McGrath |
| 2013/0290932 | A1 | 10/2013 | Kruglick |
| 2013/0297964 | A1 | 11/2013 | Hegdal et al. |
| 2013/0304616 | A1 | 11/2013 | Raleigh et al. |
| 2014/0149986 | A1 | 5/2014 | S M et al. |
| 2014/0304404 | A1 | 10/2014 | Marr et al. |
| 2015/0135185 | A1* | 5/2015 | Sirota .................. G06F 9/5061 |
| | | | 718/103 |
| 2015/0154057 | A1 | 6/2015 | McGrath et al. |
| 2015/0304176 | A1 | 10/2015 | Ting et al. |
| 2015/0365385 | A1 | 12/2015 | Hore |
| 2016/0019727 | A1 | 1/2016 | Norton et al. |
| 2016/0134557 | A1 | 5/2016 | Steinder et al. |
| 2016/0173411 | A1 | 6/2016 | Son et al. |
| 2016/0210578 | A1 | 7/2016 | Raleigh et al. |
| 2016/0269427 | A1 | 9/2016 | Haugsnes |
| 2017/0199770 | A1 | 7/2017 | Peteva et al. |
| 2017/0230266 | A1* | 8/2017 | Smola ................. H04L 43/0876 |
| 2017/0289060 | A1 | 10/2017 | Aftab et al. |
| 2018/0013656 | A1 | 1/2018 | Chen |
| 2018/0234493 | A1 | 8/2018 | Ye et al. |

FOREIGN PATENT DOCUMENTS

| | | |
|---|---|---|
| JP | 2014514659 A | 6/2014 |
| JP | 2016541183 A | 12/2016 |
| KR | 20130115553 A | 10/2013 |
| KR | 20170097071 A | 8/2017 |
| RU | 2250490 C2 | 4/2005 |
| RU | 2481618 C2 | 5/2013 |
| WO | 2014047073 A1 | 3/2014 |

OTHER PUBLICATIONS

International Search Report and Written Opinion dated Feb. 4, 2016, International Patent Application No. PCT/US2015/059983, 12 pages.
Soltesz et al., "Container-based operating system virtualization: a scalable, high-performance alternative to hypervisors," ACM SIGOPS Operating Systems Review 41(3):275-287, Mar. 2007.
Van et al., "SLA-aware Virtual Resource Management for Cloud Infrastructures," IEEE Ninth International Conference on Computer and Information Technology, Piscataway, NJ, USA, Oct. 11, 2009, pp. 357-362.
Xavier et al., "Performance evaluation of container-based virtualization for high performance computing environments," Parallel, Distributed and Network-BasedProcessing (PDP), 2013 21st Euromicro International Conference: 233-240, Feb. 2013.
Zhao et al., "Experimental study of virtual machine migration in support of reservation of cluster resources," Proceedings of the 2nd international workshop on Virtualization technology in distributed computing: 1-8, Nov. 2007.
Australian Examination Report No. 1 for Standard Patent Applicaiton dated Apr. 14, 2018, Patent Application No. 2015346530, filed Nov. 10, 2015, 3 pages.
European Communication pursuant to Article 94(3) EPC dated Sep. 9, 2018, Patent Application No. 15804248.1, filed Nov. 10, 2015, 4 pages.
Japanese Office Action dated Jul. 9, 2018, Patent Application No. 2017-524393, filed Nov. 10, 2015, 6 pages.
Korean Decision on Grant dated Nov. 20, 2018, Application No. 10-2017-7015815, filed Nov. 10, 2015, 3 pages.
Korean Notice of Preliminary Rejection dated May 28, 2018, Patent Application No. 10-2017-7015815, filed Nov. 10, 2015, 4 pages.
Russian Decision on Grant a Patent for Invention dated Jun. 26, 2018, Patent Application No. 2017116433, filed Nov. 10, 2015, 13 pages.
Uchida, "Construction of Production Environment and Deployment of Docker Containers," Web+DB Press, vol. 86, pp. 106-113, May 25, 2015.
Australian Notice of Acceptance for Patent Application dated Mar. 25, 2019, Patent Application No. 2015346530, filed Nov. 10, 2015, 3 pages.
Japanese Decision to Grant a Patent dated Apr. 1, 2019, Patent Application No. 2017-524393, filed Nov. 10, 2015, 3 pages.
Korean Notice of Preliminary Rejection dated Mar. 8, 2019, Patent Application No. 10-2019-7005048, filed Nov. 10, 2015, 3 pages.
International Search Report and Written Opinion dated Aug. 10, 2017, International Patent Application No. PCT/US2017/032480, filed May 12, 2017, 16 pages.
Mao et al., "Auto-scaling to minimize cost and meet application deadlines in cloud workflows," Proceedings of 2011 International Conference for High Performance Computing, Networking, Storage and Analysis, Nov. 12, 2011, 12 pages.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Thiele et al., "Embedded Software in Network Processors—Models and Algorithms," Lecture Notes in Computer Science 2211:416-34, Oct. 8, 2001.

* cited by examiner

CUSTOMER RESOURCE MONITORING FOR VERSATILE SCALING SERVICE SCALING POLICY RECOMMENDATIONS

BACKGROUND

Computing resource service providers leverage large-scale networks of servers and storage devices to enable their customers to execute a variety of applications and web services. Often, the computing resource service providers provide multiple types of resources that the customers can utilize together in support of an application stack. This remote, distributed computing model allows the customers to efficiently and adaptively satisfy their computing needs without having to host and maintain the computing infrastructure themselves. However, with the growing use of virtual resources, customers encounter situations, such as unanticipated load and traffic spikes, to which a fixed set of virtual resources has difficulty accommodating. Moreover, often when one resource type of an application stack needs to be scaled in response to the occurrence of such situations, other types of resources of the application stack may also need to be scaled in tandem. Current resource scaling technologies, however, are unable to accommodate automatic tandem scaling of different resource types. Furthermore, determining when and how much to scale is currently a time-consuming manual process that is susceptible to error.

BRIEF DESCRIPTION OF THE DRAWINGS

Various techniques will be described with reference to the drawings, in which.

DETAILED DESCRIPTION

Figure 1:
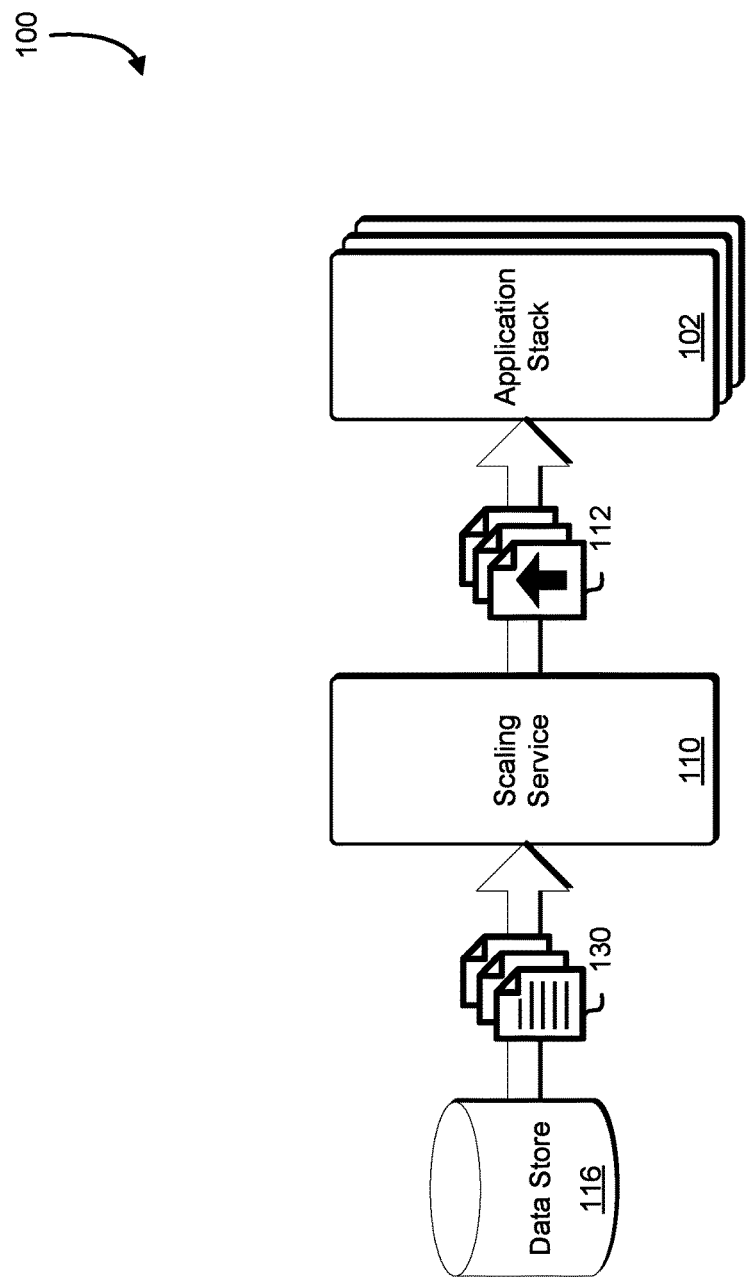
FIG. 1 illustrates an example of scaling an application stack in accordance with an embodiment.

Techniques and systems described below relate to a scaling service for scaling an application stack of a variety of resource types. In one example, the scaling service determines a correspondence between a first usage level and a second usage level for an application stack. The application stack in this example includes resources of a first resource type and a second resource type different from the first resource type, with the first usage level (e.g., utilization metrics) being associated with the first resource type and the second usage level (e.g., utilization metrics) being associated with the second resource type. For example, the scaling service may determine that a usage level of average central processing unit (CPU) utilization for a group of virtual machines in the application stack tends to be associated with a usage level of input/output operations per second for a relational database table in the application stack.

The scaling service determines scaling criteria for the resource types based on the correspondence between first usage level and a second usage level for an application stack. For example, the scaling service may determine that a certain metric associated with one resource type in the application stack tends to be associated with, track, or otherwise be related to another metric associated with a different resource in the application stack. As another example, the scaling service may determine that a load metric (e.g., requests per second) tends to influence a resource scaling metric (e.g., CPU utilization) of a resource type in the resource stack. The criteria could include a threshold for a utilization metric that, upon a measured value for the utilization metric reaching a value relative to the threshold, triggers an alarm associated with the scaling policy. As another example, the criteria could include a time and/or date whereupon, based on historic usage of the resources, the scaling service predicts utilization of the resource types to be at certain levels (e.g., peak usage between 6:00 PM and 7:00 PM nightly, low usage levels on Sundays, etc.).

The scaling service may present the criteria to the customer-owner of the application stack for selection or modification and upon approval or modification by the customer may set alarms to trigger in response to usage levels fulfilling the approved or modified criteria. In some examples, where the scaling service presents the customer with a hands-off option, the scaling service may determine the criteria and set alarms without further input from the customer. In some examples, the customer can select a tracking metric and specify a desired range for the tracking metrics, and the scaling service determines the alarms and determines how to scale resources in order to maintain the tracking metric within the desired range.

Upon triggering the alarm, the scaling service may receive an alarm notification that indicates that a first alarm and/or a second alarm have been triggered. For example, a first alarm may indicate that central processor unit (CPU) utilization is above a 75% level, and a second alarm may indicate that database usage may be exceeding a threshold. The scaling service obtains the scaling policy or policies associated with the alarms and computes the new capacities for resources of the resource types to be scaled based on parameters in the scaling policies and the current capacities of the resources. Once the new capacities are computed, the scaling service may output the new capacities to services providing the resource types, thereby causing the appropriate resources of the resource types to be scaled in accordance with the newly computed capacities.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of computer resource scaling, by analyzing historical data relating to resource utilization in order to determine utilization patterns that can be used to provide scaling policy recommendations and develop predictive scaling policies. Additionally, techniques described and suggested in the present disclosure improve the efficiency of computing services by synchronizing resources of different types to be scaled in tandem. Moreover, techniques described and suggested in the present disclosure are necessarily rooted in computer technology in order to overcome problems specifically arising with customers having to manually determine appropriate thresholds for dynamic scaling of their computing resources.

FIG. 1 illustrates an aspect of an environment 100 in which an embodiment may be practiced. As illustrated in FIG. 1, the environment 100 may include a scaling service 110 that, as a result of receiving a notification to scale an application stack 102, obtains a set of scaling policies 130 for scaling the application stack 102 and, based on the set of scaling policies 130 and current capacities of the application stack 102, computes scaling information 112 usable by the application stack 102 to modify the current capacities to new capacities. Alternatively, a single scaling policy 130 may be used to compute scaling information 112 usable by the application stack 102 to scale accordingly.

Often a customer of a computing resource service provider may use multiple different types of resources provided by the computing resource service provider in conjunction with each other. For example, the customer may have a set of virtual machine instances of virtual computing system service that interact with a database table of a database service and/or data stores of a data storage service, all hosted by the computing resource service provider and provided to the customer. The application stack 102, therefore, represents a plurality of resource types that are communicatively coupled to support an overall application.

The scaling service 110 may be a service provided by a computing resource service provider configured to automatically and dynamically manage computing resources that might be subject to demand fluctuation. For example, the scaling service 110 may respond to alarms or other notifications from external applications (such as the alarm notification 208 of FIG. 2) transmitted to the scaling service 110 by a telemetry service, to cause another service, such as the scalable resource service 102, to adjust and/or allocate a resource capacity. The scaling service 110 may support scaling actions such as scaling up, scaling down, scaling in, and scaling out. In some examples, the term "scale-out" may refer to the concept of replicating/creating additional resources (e.g., adding additional software containers) of the type being scaled. Likewise, the term "scale-in" may refer to the concept of reducing/terminating a number of resources (e.g., terminating container instances) of the type being scaled. Similarly, the term "scale-up" may refer to increasing a magnitude of a resource (e.g., increasing the size of a storage volume). As well, the term "scale-down" may refer to decreasing a magnitude of a resource (e.g., reducing a read throughput of a database service table).

As described in the present disclosure, upon receiving an alarm notification, the scaling service 110 retrieves a scaling policy that corresponds to the alarm. In some examples, the scaling policy may be stored with an identifier associated with a particular alarm, and the alarm notification includes the identifier; in this manner, the scaling service 110 can locate the proper scaling policy by retrieving the scaling policy containing the matching identifier for the alarm that was triggered. In other examples, the alarm is stored with an identifier associated with the corresponding scaling policy and the alarm notification includes the identifier for the corresponding scaling policy; in this manner, the scaling service 110 can locate the corresponding scaling policy matching the included identifier.

In some embodiments, a scaling policy may refer to, for example, information or a script that defines how to scale a scalable target (e.g., a scalable dimension of a resource of the application stack 102). For example, a scaling policy may provide the parameters required by the scaling service 110 to calculate a new capacity (i.e., scaling amount) for the scalable target. The scaling service 110 or some other service of the computing resource service provider may record an entry in a log, for later reference by the customer-owner of the scalable target, each time the scaling service 110 outputs a new capacity. This log may represent the scaling history of the scalable resource service 102. Note that in some implementations a customer can issue a command directly to the scaling service 110 to execute the scaling policy. In these cases, the telemetry service (and the alarm notifications) would be bypassed. Likewise, in some implementations some scaling policies execute according to a predetermined schedule (e.g., according to a schedule specified by the customer). In these cases, the scaling service 110 may receive the alarm notification that causes the scaling policy to be executed from a scheduler service, from the customer, or from some service other than the telemetry service. The scaling policy may also include information about how the utilization of different resource types are related or associated, so that different resource types can be scaled with a single scaling policy. For example, the scaling policy may indicate that, if CPU utilization exceeds 75%, not only should the compute resources be scaled up by X number, but also should the database resources by Y number, because there is a correlation between CPU utilization above 75% and the utilization of database resources that is occurring (or will likely occur).

The scaling information 112 specified by the scaling policy may include new capacity calculations by the scaling service 110 in accordance with the set of scaling policies 130 and the current capacities of resources of the application stack 102. The new capacities reflect estimates of what the capacity of each resource to be scaled should be. Receipt of the new capacities by the application stack 102 may cause the applications of the application stack 102 to perform a corresponding scaling actions. In some examples, a "scaling action" may refer to an action taken to increase or decrease the desired capacity of a scalable target. In some examples, a "scalable target" (or "target" for short) may refer to a scalable dimension (e.g., up, down, in, out, etc.) of a scalable resource provided by a service that provides such resources. The scalable dimension may be a dimension individually identified from a combination of values, such as an identity/name of the service, an identity of the scalable resource, and an indicator representing the dimension being scaled.

Outputting the scaling information 112 may cause additional actions to be performed in addition to or alternative to adjusting a capacity of the scalable target. For example, a text message may be sent to an administrator of the application stack 102. Moreover, if a current capacity of a scalable target already matches the new capacity, the scaling action may not be performed or performance may be deferred. The scaling information 112 may be sent in a variety of formats, such as in a message encoded in JavaScript Object Notation (JSON) or some other format.

The scaling service 110 may further keep a record of scaling activity. For example, the scaling service 110 may log the time that new scaling capacities are computed, sent, and/or each time a notification is received to scale the application stack. Additional information logged may include a transaction identifier (ID) associated with the scaling activity and a timestamp. The record of scaling activity may further include whether or not the application stack 102 successfully implemented the new capacity. Thus, in addition to the new capacity, the scaling information may include other information such as the transaction ID.

The data store 116 may be a repository for data objects, such as database records, flat files, and other data objects. Examples of data stores include file systems, relational databases, non-relational databases, object-oriented databases, comma delimited files, and other files. In some implementations, the data store 116 is a distributed data store. The data store 116 depicted in FIG. 1 may be a repository for storing the set of scaling policies 130.

The set of scaling policies 130 may be sets of parameters defined by a customer of a computing resource service provider. The sets of parameters may specify resources to be scaled and may specify how to effect scaling for the resources when triggered. The sets of parameters may be stored in the data store 116, such as in fields of a database table record. Examples of how the scaling policies 130 may be triggered include being triggered in response to a measurement of resource usage meeting specified criteria, in response to an occurrence of a specified event, according to a schedule, or as a result of a direct command by the customer. More details about the scaling policies 130 may be found in the description of FIG. 4.

Often when one resource type of an application stack, such as the application stack 102, needs to be scaled (e.g., up, down, in, out, etc.) due to some change in resource usage or demand, other resource types of the application stack may also need to be scaled as well (i.e., in tandem). Take, for example, an application stack comprising a group of virtual machine instances of a virtual computing system service and a group of database tables of a database service. In this example, the virtual machine instances operate as Web servers and cause data to be stored to the group of database tables. In this example, as the application stack receives more network traffic volume and data to be stored in the database tables, additional virtual machine instances may need to be instantiated to handle the network traffic volume, and the database tables may need to be increased in size in order to store the additional data. In this manner, FIG. 1 depicts the scenario where the set of scaling policies 130 causes the scaling service 110 to compute two different new capacities (one for the virtual computing system service and one for the database service) for the application stack. Note that if the network traffic volume later decreases, the scaling service 110 may compute a new (reduced) capacity for the virtual computing system service, whereas the size of the database tables may not be decreased if such decrease would cause loss of data. Thus, resources may be scaled in tandem in one dimension but need not be scaled in tandem in another.

Figure 2:
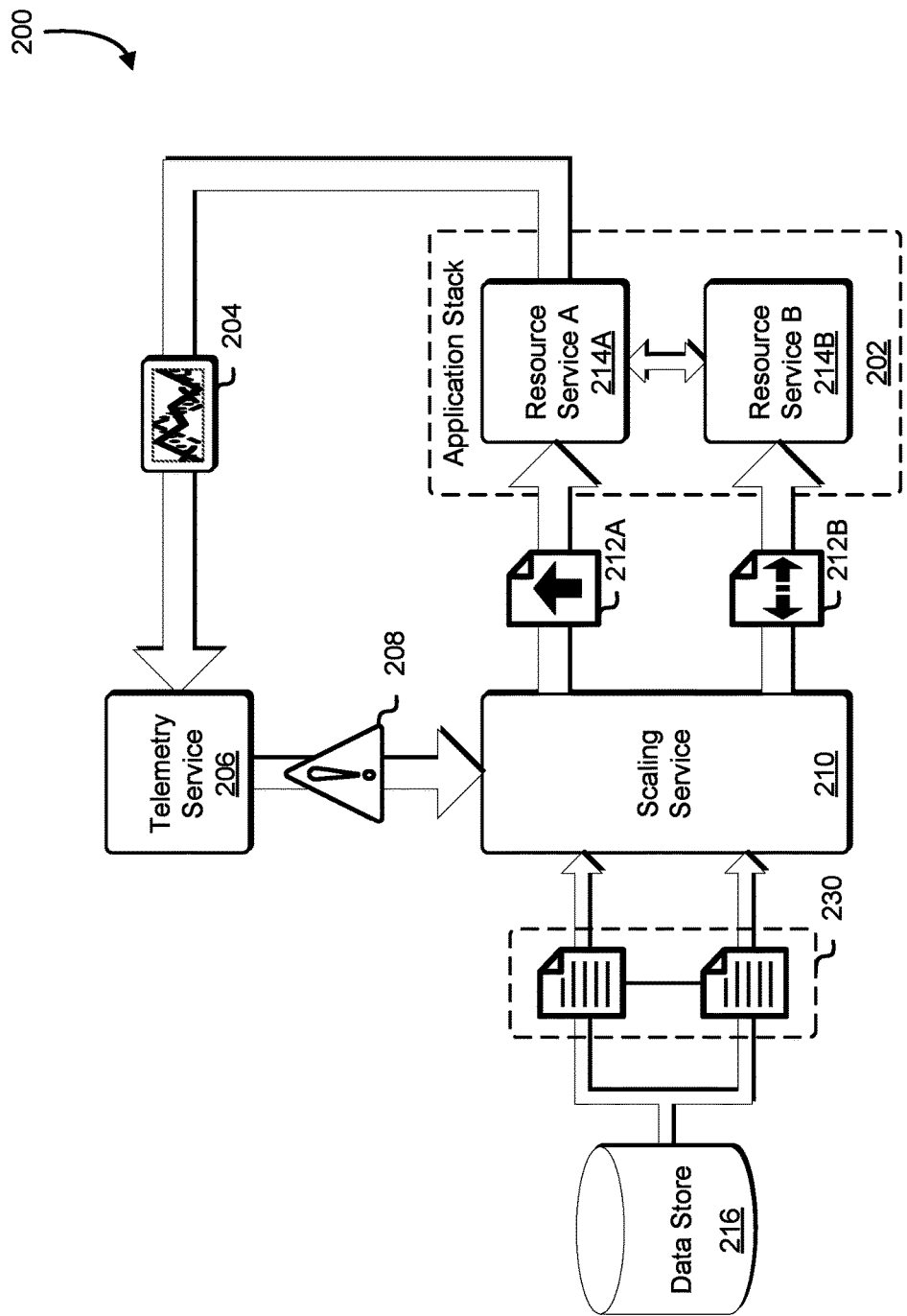
FIG. 2 illustrates an example of scaling an application stack in response to receiving a notification from a telemetry service in accordance with an embodiment.

FIG. 2 illustrates an aspect of an environment 200 in which an embodiment may be practiced. As illustrated in FIG. 2, the environment 200 may include an application stack 202, comprising resource services 214A-14B, from which measurements 204 are emitted to a telemetry service 206. FIG. 2 shows that the measurements 204 have fulfilled criteria corresponding to an alarm of the telemetry service 206, which causes the telemetry service 206 to send an alarm notification 208 to a scaling service 210. In response to receiving the alarm notification 208, the scaling service 210 obtains a scaling policy or policies 230 corresponding to the alarm notification 208 from the data store 216. Based on the scaling policies and current capacities of target resources of the resource services 214A-14B, the scaling service 210 outputs scaling information 212A-12B to the resource services 214A-14B respectively.

The application stack 202 may be a plurality of resources of different types supporting a particular application of a customer of a computing resource service provider, similar to the application stack 102 of FIG. 1. The measurements 204 may be measurements corresponding to a particular telemetry metric. The measurements 204 may be measurements related to resource usage of one or more resources of the resource services 214A-14B. Although the environment 200 depicts measurements only being emitted by the resource service 214, it is contemplated that the measurements 204 may be admitted to the telemetry service 206 from either resource service 214A-14B or from multiple resource services of the application stack 202. In some implementations, the measurements 204 can be received from a source outside of the application stack 202.

Examples of such measurements (and metrics) include network utilization, network bandwidth, latency measurements, number of hops in a path from a source to a destination in a network, frequency of communication between services or software applications, an amount of data transferred between services or software applications, network throughput, health levels for persistent storage or for servers, duration (e.g., average, peak, etc.) of task execution, disk input/output rates, processor (real or physical) utilization (e.g., average, peak, thread starvation, etc.), frequency of processor utilization spikes, amount of memory (real or virtual) utilization, request response time (i.e., latency of the application in responding to or fulfilling requests), power consumption by the hardware of the systems hosting the application stack 202, and so on. In some examples, a "telemetry metric" may refer to the type of measurements being made (e.g., input/output operations per second for specified persistent storage, average processor utilization over time, etc.), and "telemetry measurements" may refer to the measurement value at a particular time. However, it is also contemplated that the measurements 204 may represent other values, events, commands, or signals than telemetry metrics (e.g., a notification, occurrence of an event, a command from the customer to execute a scaling policy, etc.).

The telemetry service 206 may be may be a service configured to aggregate control group measurements (e.g., information about the state of an application stack 202) and container logs, such as the telemetry service described in U.S. patent application Ser. No. 15/194,479, entitled "VERSATILE AUTOSCALING," filed on Jun. 27, 2016, and U.S. Provisional Application No. 62/337,809, filed on May 17, 2016, entitled "VERSATILE AUTOSCALING," the contents of which are incorporated by reference herein in their entirety. Control group measurements include information such as the amount of memory used by processes running under the application stack 202, number of times that a process running under the application stack 202 triggered a page fault, central processing unit usage by processes running under the application stack 202, time during which the central processing units were executing system calls on behalf of processes running under the application stack 202, number of reads and writes to the resource services 214A-14B of the application stack 202, network traffic volume used by the resource services 214A-14B of the application stack 202 on behalf of the customer, and number of input/ output operations queued for the application stack 202. The telemetry service 206 may allow the customers to configure the telemetry service 206 to send an alarm notification, such as the alarm notification 208, to another application or service (such as the scaling service 210) as a result of certain control group metrics reaching a value relative to a threshold. Alternatively, one metric or alarm may be used to scale multiple different resources because, for example, the utilization of those resources are correlated, associated, or otherwise related.

The alarm notification 208 represents an indication that an event has occurred (such as a telemetry service alarm has been triggered, a specified event has occurred, a scheduled time has passed, etc.). The alarm notification 208 may be a notification sent from the telemetry service 206 to the scaling service 210 upon fulfillment of criteria for triggering the alarm. That is, the customer may define parameters that trigger the alarm, which causes the alarm notification 208 to be sent to the scaling service 210. In some cases, the alarm may be triggered based on metrics of a service different from the resource service to be scaled. For example, a load that exceeds a threshold (according to the alarm conditions) at the resource service 214A may trigger the alarm notification 208 to be sent to the scaling service 210, and the scaling policy corresponding to the alarm notification 208 may dictate that a resource of the resource service 214B should be scaled-out.

In one example, the scaling service 210 receives the alarm notification 208. The scaling service 210 obtains the scaling policy or policies 230 that correspond to the alarm. While in the FIG. 2 two scaling policies are shown, more than two or even one scaling policy 230 may be sent. In the example of one scaling policy, that scaling policy 230 may have information about how to scale a variety of resource types based on the alarm notification 208. In some cases the alarm notification 208 includes an indication of the current capacity of one or more of the resource services 214A-14B to be scaled. In other cases, the scaling service 210 may query the resource services 214A-14B for current capacities of the resources to be scaled. In this example, the current capacity of the target being scaled of the resource service 214A is five and the current capacity of the target being scaled of the resource service 214B is seven. The scaling service 210 calculates, based on the scaling policy or policies 230 and the current capacities, that the new capacities for the target of the resource service 214A in the resource service 214B, respectively, need to be 11 and 13. Thus, the scaling service 210 passes the new capacity of 11 to the resource service 214A via the scaling information 212A and passes the new capacity of 13 to the resource service 214B via the scaling information 212B.

The scaling service 210 may be a service of a computing resource service provider that provides the resources 214A-14B of the application stack 202 to a customer, such as the scaling service 110 of FIG. 1. The scaling information 212A-12B may be information, similar to the scaling information 112, including new capacity calculations made by the scaling service 210 for the respective resource services 214A-14B.

The resource services 214A-14B may be services configured to provide access to computing resources (e.g., data processing, data storage, applications, interfaces, permissions, security policies, encryption, and/or other such services) where such resources have one or more scalable dimensions. The computing resource service provider may provide a user interface, such as a command line interface or web console, or a software development kit whereby the customer can submit requests (e.g., appropriately configured API calls) to the resource services 214A-14B. The resource services 214A-14B may be configured to access each other and/or one or more other services (e.g., data storage, authentication services, encryption service, etc.). In addition, communication between resource services 214A-14B may be secured via encryption keys and/or other such secured/protected access methods, thereby ensuring secure communications and protected access between the services.

The data store 216 may be a repository for storing data, such as the data store 116 of FIG. 1. Likewise, the scaling policy or policies 230 may be comprised of parameters and parameter values that specify how certain resources should be scaled, similar to the set of scaling policies 130. FIG. 2 depicts a pair of the scaling policy or policies 230 that are triggered as a result of receipt of the alarm notification 208 by the scaling service 210. One of the scaling policy or policies 230 governs the calculation of a first new capacity sent with the scaling information 212A, while the other of the policy or policies 230 governs the calculation a second new capacity sent with the scaling information 212B. A scaling policy may include parameters such as a threshold value (which may be a percentage or an absolute value), maximum value (e.g., that the scaling service cannot scale beyond), a minimum value (e.g., that the scaling service cannot scale below), a step or percentage value (e.g., that governs how much to scale up/down/in/out the resource from the current capacity), an identity of the resource being scaled, a scaling target value or range (e.g., scale up/down/in/out to maintain a metric at a certain level), a scaling target resource type, and so on. In embodiments where a single scaling policy includes scaling information for multiple resource types, the scaling information for one resource type may be linked to another set of scaling information for another resource type (e.g., they may share a common identifier that corresponds to the scaling policy), the scaling policy, upon invocation, causes all scaling information sharing the common identifier to be retrieved and processed. Alternatively, each set of scaling information for a resource may include an identifier as well as a field that can hold an identifier linking a first set of scaling information to a second set of scaling information, thereby creating a chain of scaling actions within a single scaling policy.

In another aspect of the present disclosure, the scaling service 210 recommends, at the request of the customer, scaling policies based on relationships determined from the application stack. The scaling service 210 determines relationships between the resources in the application stack and the relationships between usage metrics and the resources. Based on these relationships, the scaling service 210 can make recommendations (e.g., recommendation for alarm thresholds for metrics for individual resources, how much to change capacity when the metrics fall below or rise above the alarm threshold, etc.). In this manner, the customer can be relieved of the burden of determining the most relevant metrics and determining the appropriate amount to scale. The scaling service 210 makes these determinations by analyzing historical traffic volume data.

In still another aspect of the present disclosure, the scaling service 210 analyzes historic traffic volume data to propose predictive scaling policies and predictive scaling actions. For example, based on an analysis of the historical data, the scaling service 210 proposes performing a scaling action at a certain time because, based on the historical data, traffic volume is expected to substantially change at that time (e.g., spike up, fall off, etc.). For example, the scaling service 210 may suggest to scale a resource dimension down to 10 units for the period between 9:00 PM to 7:00 AM because traffic volume is estimated to decrease during this time. The scaling service 210 might suggest scaling the resource dimension up to 30 units from 2:00 PM to 5:00 PM because there is often a traffic volume surge at this time, and maintaining the resource dimension at 20 units other times.

The predictive scaling may be implemented alone or in conjunction with the tandem scaling of resource types within the application stack 202 as described in the present disclosure. Predictive scaling allows a customer to scale resources in advance of a likely event and can be complimentary to reactive scaling that scales in response to the occurrence of events. In some implementations, reactive scaling takes precedent over predictive scaling in order to provide a safeguard against faulty predictions. For example, if predictive scaling expects a sudden increase in network traffic volume and scales up resources accordingly, a reactive scaling policy may be triggered to scale down by a corresponding amount if the predicted volume increase does not occur after a certain amount of time, thereby saving the customer the expense of paying for underutilized resources. As another example, if predictive scaling expects a decrease in network traffic volume and decreases resources in anticipation, a reactive scaling policy could be triggered to increase the resources by a like amount if the predicted decrease does not materialize (e.g., after a certain amount of time).

For predictive scaling, the scaling service may determine a relationship between a load metric (e.g., network traffic volume, number of messages in a message queue, etc.), and consumption of a particular resource. That is, the scaling service may analyze how the load metric influences or is influenced by a resource consumption metric (e.g., CPU utilization). As an example, for a given application stack the scaling service determines that at a high (e.g., above a certain value corresponding to that metric) traffic volume, CPU utilization is likewise high (e.g., above a certain value corresponding to that metric).

In some examples, the term "load metric" may refer to a type of measurement that is a measure of demand being placed on the resources, often received from an entity external to the particular resource performing the work. An example of a load metric is a number of requests made to the application stack per second. In some examples, the term "performance metric" may refer to a type of measurement that is a measure of how proficiently the application stack is able to provide a result. An example of a performance metric is a time latency between a request and receipt of the result or response of the request. In some examples, the term "resource scaling metric" may refer to a measure of activity of a particular resource. Examples of resource scaling metrics are CPU utilization and input/output operations per second.

In embodiments, the load metric may be preferable for determination of the pattern as a resource consumption metric may be influenced by the capacity of the resource (e.g., low capacity may cause the resource consumption metric to be high, whereas high-capacity may cause the resource consumption metric to be low). On the other hand, it is possible to predict with a certain degree of accuracy, based on a load metric, how much traffic volume may be received during a particular time/date range. Thus, the scaling service may determine, based on historical data for the application stack, whether a pattern exists for the load metric. For example, implementations of the scaling service might be capable of determining whether the load metric is typically above or below a certain value during certain periods of the day, certain days of the week, certain months or seasons of the year, before or after certain holidays (e.g., Christmas day, Thanksgiving day, the week before Christmas, Black Friday, the days before Super Bowl Sunday, Boxing Day, etc.), and so on. In an embodiment, the scaling service analyzes the historical data to determine a week-over-week pattern. In an example, the scaling service determines that during a particular time interval on Tuesdays, the network traffic volume is likely to be at a particular level, based on an analysis of the network traffic volume during the particular interval on previous Tuesdays. In this example, since the next Tuesday's network traffic volume may also be influenced by a previous day's traffic volume, the determination of what level the network traffic volume is likely to be at during the particular time interval will also factor in the network traffic volume during the particular time interval today. As still another example, the scaling service can examine the network traffic volume during a particular time interval for a number of previous days (e.g., one day, five days, ten days, etc.) and determine whether a statistical trend exists or determine a running average. Historical data may be weighted; for example, network traffic volume from two weeks ago may be given less weight than network traffic volume from one week ago, and network traffic volume from one week ago may be given more or less weight than network traffic volume from the previous day. In this manner, the scaling service may estimate an amount of network traffic volume on a future date at that particular time interval.

The application stack may comprise various types of resources, not all of which may be scalable. However, examples of scalable resource types include databases and database tables (relational or non-relational), virtual machine instances, software containers, data storage (e.g., block-level storage, archival storage, on-demand storage, etc.), and other computing resources.

Figure 3:
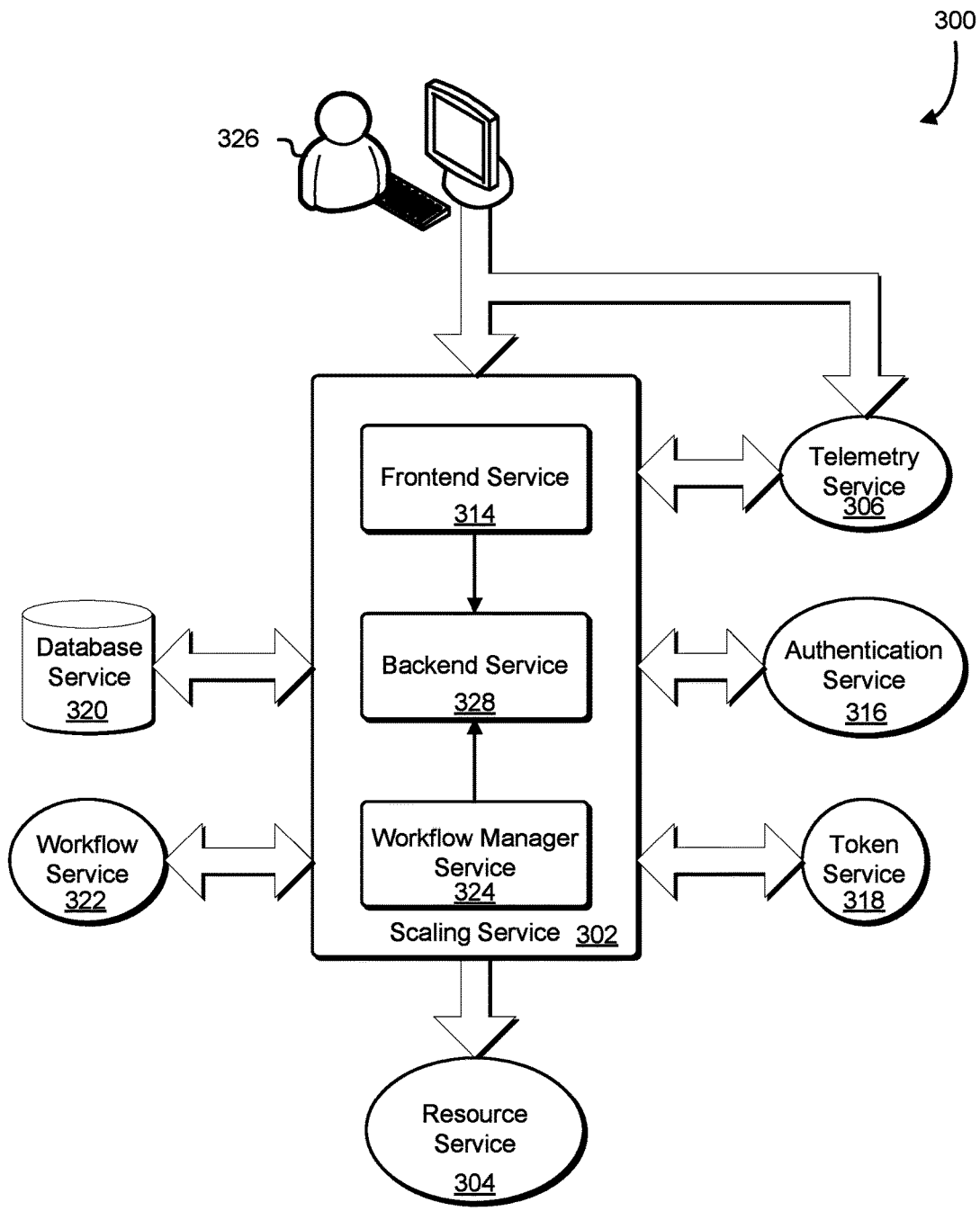
FIG. 3 illustrates an example of a scaling service in accordance with an embodiment.

FIG. 3 illustrates system architecture of a scaling service 302 that may interact with other services in an environment 300 in which an embodiment may be practiced. As illustrated in FIG. 3, the environment 300 may include a scaling service 302 comprising a scaling service frontend 314, a scaling service backend 328, and a scaling service workflow manager 324. A customer 326 may set scaling policies via the scaling service frontend 314 and may also set alarm actions with a telemetry service 306 that trigger the scaling policies. Calls made to the scaling service frontend 314 may be authenticated by an authentication service 316. Scaling policies may be stored with the database service 320 by the scaling service backend 328, and scaling actions may be initiated through a scaling service workflow manager 324 by the scaling service backend 328. The customer 326 may specify, via a policy/role management service (not shown), a role to be assigned to the scaling service 302, and the scaling service 302 may obtain a token from a token service 318 as proof that the scaling service 302 has been granted that role. Upon triggering a scaling policy, the scaling service 302 may obtain a resource's current capacity and set the resource's capacity for its respective resource service of the resource services 304 under the specified role.

The scaling service frontend 314 may be the frontend for the scaling service 302. That is, the scaling service frontend 314 provides the customer 326 with a single endpoint. The customer 326 may use an interface console or call an API to instruct the scaling service 302 to create scaling policies for their resources. That is, the customer 326 may submit scaling service API requests to the scaling service frontend 314. The scaling service frontend 314 may pass the requests through to the scaling service backend 328. For example, the customer 326 may use a service interface (i.e., via the scaling service frontend 314) to register a scalable target. The scalable target may refer to a dimension of the resource that the customer 326 may scale. In some examples, the scalable target may include a service ID or namespace, a resource ID, and/or a dimension name or identifier such that the scalable target uniquely identifies which dimension of the particular resource of the particular service to scale. Once the scalable target is registered, the customer 326 may create a scaling policy to be associated with the scalable target.

The scaling service backend 328 may be the backend data and/or control plane for the scaling service 302. The scaling service backend 328 may receive and process scaling requests (e.g., via a control plane) and create, read, update, and delete in response to corresponding API requests (e.g., via a data plane). For scaling requests, the scaling service backend 328 may calculate a new desired capacity and launch a scaling workflow via the workflow service 322, which in itself may interact with the target resource and use a control plane service to track and record the interaction. The policies, scaling activities, and identities of scalable targets may be stored with a database service 320, and then a workflow service 322 may be used to orchestrate the scaling workflow. The computing resource service provider may provide general APIs for managing the scaling of various resource service types so that the customer 326 need learn only one API to scale all their resources. In order for the scaling service 302 to determine which resource to scale, in some examples a resource is individually identifiable and has one or more scalability measures (e.g., scalable dimensions) that may be independently increased or decreased. That is, the customer 326 identifies the resource they want to auto-scale. For example, in some implementations a resource can be identified by a URI. Additionally or alternatively, in some implementations a resource can be identified by a service name specified by the customer 326.

A resource may be unambiguously identified based on the partition, service, region, account ID, and/or resource identifier, and the combination of service namespace, resource ID, and scalable dimension may uniquely identify a scalable target. Among these pieces of information, the scaling service may only require the service and resource identifier (ID) from the customer 326. Using a combination of service namespace and resource ID may have advantages over using URIs. For example, the customer 326 may describe the customer's resources registered in the scaling service 302 with reference to service namespace and resource ID or by service namespace only and, in this way, the customer 326 need not construct or keep track of URIs. Such an implementation would then accommodate resource services that do not use URIs.

In some embodiments, the customer 326 can specify a URI in the resource ID, and the system will assume that the service namespace is the one in the URI. In some implementations, alternative to or in addition to individual resource scaling, the scaling service 302 provides application scaling. In some examples, "application scaling" may refer to scaling a group of related resources that form an application stack of the customer 326. For the purpose of scaling, the group of related resources, itself, would be a resource and would be uniquely identifiable. Therefore, the concepts of service namespace and resource ID also apply to application scaling.

However, if the customer 326 only intends to scale one resource, the scaling service need not know that it belongs to a group. On the other hand, if the intention is to scale the group as a whole, the customer 326 should consider scaling the group versus scaling the resources in it. It should be the job of the scaling service 302 to determine how to scale the resources. Regarding scalable dimensions, identifying the resource alone may not be sufficient to determine what dimension of the resource to scale. For example, as noted above, the customer 326 may separately scale the read and write provisioned throughputs of a database service table. In general, a resource may have more than one scalable dimension that may be changed independently.

Therefore, in addition to service namespace and resource ID, the scaling service 302 may require the customer 326 to specify which "dimension" of a resource the customer 326 wants to scale. As an example, a database service table, or global secondary index (GSI), has read and write provisioned throughputs that can be changed independently and that can be regarded as scalable dimensions. For database service tables and GSIs, there may be at least two scalable dimensions for read and write provisioned throughputs, respectively. The customer 326 may define maximum and minimum boundaries and scaling policies per table/GSI and per scalable dimension.

Determination of whether to trigger a scaling policy and the scaling service 302 may be made by a source external to the scaling service 302, such as the telemetry service 306. That is, a scaling policy may be attached to a telemetry service alarm of the telemetry service 306 by the customer 326, and the scaling policy may be triggered by the telemetry service alarm. For example, the customer 326 could create a telemetry service alarm with the telemetry service 306 on any measurement being aggregated by the telemetry service (e.g., processor utilization). At the telemetry service 306, one or more thresholds may be specified for the telemetry service alarm; for example, the customer 326 may specify that the telemetry service alarm should fire when processor utilization reaches 30 percent utilization. Once the telemetry service alarm is set up, the customer 326 may attach any scaling policy to it, such that when the alarm fires (i.e., the measurement value exceeds the threshold), it may trigger the scaling policy.

The telemetry service 306 may call the scaling service 302 to invoke a scaling policy when an associated alarm enters a state that triggers the scaling policy. In some cases, the telemetry service 306 may periodically (e.g., every minute) invoke the scaling policy for as long as the alarm remains in that state. In some embodiments, the telemetry service 306 invokes a scaling policy only once per alarm state, and then a workflow may be performed after performing a scaling action to check the alarm state to determine if further scaling is needed.

As a result of the alarm firing, a notification of the alarm is sent to the scaling service frontend 314. The scaling service frontend 314 passes this information to the scaling service backend 328, which then fetches the corresponding scaling policy from the database service 320. The scaling service backend 328 examines the parameters in the retrieved scaling policy, obtains the current capacity of the resource to be scaled from the appropriate resource service, and performs the calculations specified by the scaling policy in view of the current capacity to determine that the new desired capacity for the resource needs to be scaled. Note that for some policy types, like a step policy, the scaling service 302 will get information about the metric in order to determine which steps in the scaling policy to apply to the resource. For example, the customer 326 may create a scaling policy for scaling up and down a resource based on a metric that is an indication of application load or traffic volume by setting up an alarm to trigger at certain thresholds of application load or traffic volume and attaching a policy to it. In this example, triggering the alarm will invoke the policy so that when traffic volume goes up and down, the resource will be scaled as dictated by the scaling policy.

In some embodiments, the telemetry service 306 sends alarms in response to the occurrence of certain specified events (i.e., telemetry events). Examples of such events include sending a message via a message queuing service or executing certain functions in a software container. Additionally or alternatively, in some embodiments scaling policies can be triggered according to a predefined schedule. For example, the customer 326 may set a scaling schedule that triggers a scaling policy at 6:00 PM every day. Interruption of the telemetry service 306 may result in delayed scaling due to the delay in a telemetry service alarm being sent to the scaling service 302 to trigger execution of a scaling policy. Although metric-based alarms may be impacted due to unavailability of the telemetry service 306, on-demand (e.g., the customer 326 via the scaling service frontend 314) and scheduled scaling (e.g., command sent to the scaling service frontend 314 according to a schedule) would not be affected.

Upon receiving a call from the telemetry service 306 to invoke a scaling policy, the scaling service backend 328 may synchronously calculate the new desired capacity for the scalable target, and the scaling service workflow manager 324 may asynchronously set the desired capacity for the scalable target. The scaling service workflow manager 324 may contain workflow and activity definitions that are used when effecting and monitoring changes to the target service. Workflows may be launched by the scaling service workflow manager 324, which may utilize a control plane service to record, in the database service 320, interactions with the target service. Besides setting desired capacity, the scaling service workflow manager 324 may also record scaling activities. In some embodiments, the scaling service workflow manager 324 can also send notifications and/or publish events. The scaling service backend 328 may be responsible for starting workflow executions (e.g., via the workflow service 322). In some embodiments, a message queuing service is located between the scaling service backend 328 and the workflow service 322 for queuing workflow commands.

The database service 320 may be used to track the state of scaling activities, to store identities of scalable targets registered by the customer 326, and to store scaling policies defined by the customer 326. The scaling policies may be stored with the database service 320 in any applicable format, such as in a JavaScript Object Notation format in a table with the database service 320. However, the scaling policy may be automatically generated by the scaling service 302 so that the customer 326 need not directly provide the scaling policy. If the database service 320 has an outage, various methods may be performed to minimize adverse impact to the scaling service 302. For example, scalable targets and scaling policies may be cached; in this manner, new entities may not be created but the scaling service 302 will continue to automatically scale existing scalable targets. As another example, recording of the scaling history is made as a best effort; in other words, accuracy of the scaling history is traded for availability, and "dangling" scaling activities may be closed. As still another example, the process of writing scaling tasks to the database service 320 could be bypassed; for example, the scaling service backend 328 may put, in a queue of a message queuing service, a message for a scaling task that includes all of the data that the workflow service 322 needs in the message. Note that although FIG. 3 shows the database service 320 as residing external to the scaling service 302, it is contemplated that, in some embodiments, the functionality provided by the database service 320 may be found wholly or partially within the scaling service 302.

The resource services 304 may be services provided by a computing resource service provider hosting resources with scalable dimensions. If a resource service has a problem, scaling may be impacted as the scaling service 302 may be unable to get the current capacity of or update the resources of the resource service. In some embodiments, the resource service is able to continue accepting and queuing scaling requests even if the resource service is offline, although processing such requests may be impacted.

The customer 326 may execute a scaling policy in a variety of ways. For example, in some embodiments the customer 326 can execute the policy using a command line interface, a software development kit, or a console interface (e.g., accessible via a browser). As another example, in some embodiments the customer 326 can have the policy invoked in response to receiving an alarm from the telemetry service 306. As still another example, the customer 326 can have the policy invoked by the occurrence of an event detected by the telemetry service 306. In yet another example, the customer 326 can have the policy invoked according to a schedule specified to the telemetry service 306 by the customer 326.

Each scaling action (i.e., each change made to a resource's scalable dimension) may have associated metadata, such as a unique activity identifier (ID), resource URI, description, cause, start time, end time, and/or status. This associated metadata may be recorded/logged with the database service 320 in conjunction with each scaling action performed by the scaling service 302. The customer 326 may subsequently query the scaling activities of a particular resource service by its URI. Scaling actions may cause a telemetry service event to be published.

After each change to the scalable dimension (e.g., the desired task count of the service construct), the system may check the current alarm state to see if additional scaling is required. The behavior may be as follows:

If scaling policy is an action for OK state (i.e., maintain current state), no action is taken.

If scaling policy is an action for ALARM or INSUFFICIENT_DATA state:
  Get the alarm's current state.
  If the alarm's current state matches the configured policy:
    If timeout has expired, reset alarm state to OK (this ensures that if the state goes into ALARM or INSUFFICIENT_DATA again, the telemetry service 306 may call the scaling service 302 to execute the policy again.
    If timeout has not expired:
      If current time is after cooldown expiration time, call InvokeAlarmAction( ) to execute the policy again.
      Otherwise, wait an amount of time (e.g., one minute) and repeat the process step, starting from getting alarm state (e.g., an alarm is evaluated every minute).

If the scaling policy is triggered manually by the customer 326, by the occurrence of an event or according to a schedule, rather than by an alarm of the telemetry service 306, the desired task count of the service construct may be changed based on the current running count and the scaling adjustment specified in the policy, within the minimum and maximum capacity. The scaling service 302 may apply the scaling adjustment specified in the policy to the current running count of the service construct.

The running count may be the actual processing capacity, as opposed to the desired task count, which is what the processing capacity is supposed to be. Calculating the new desired task count from the running count may prevent excessive scaling. For example, if the scaling service 302 has increased the desired task count by 1, the alarm that triggered the scaling policy may still be active during the time that the task is being launched. However, once the new task is fully launched, the alarm may be deactivated, ensuring that the scaling service 302 does not scale-out further.

In some embodiments, scale-out is prioritized over scale-in; i.e., a scale-out will override an in-progress scale-in but not vice versa. In other embodiments, the reverse is true. An in-progress scale-in may be indicated by the running count being greater than the desired task count. In this situation, the scaling service 302 may allow a scale-out to increase the desired task count in a manner that optimally maintains application availability. Conversely, an in-progress scale-out may be indicated by the running count being less than the desired task count, in which case the scaling service 302 may not allow a scale-in to decrease the desired task count in order to optimally protect application availability.

The combination of Resource URI and Context may uniquely identify a scalable resource. Supported policy types for scaling may include "SimpleScaling," "StepScaling," and "TargetUtilizationScaling." Each policy type has its own configuration parameters. For "SimpleScaling," the policy configuration may have the following parameters:

AdjustmentType: "PercentChangeInCapacity," "ChangeInCapacity," or "ExactCapacity."

ScalingAdjustment: a number whose meaning depends on adjustment type; e.g., if scaling adjustment is 10 and adjustment type is percentage change in capacity, then the adjustment is plus 10 percent of actual capacity.

MinAdjustmentMagnitude: may only be applicable when AdjustmentType is "PercentChangeInCapacity," to protect against an event where the specified percentage of the current capacity results in a very small number.

Cooldown: allows the customer 326 to specify an amount of time to pass (e.g., number of seconds) before allowing additional scaling actions; it starts once a scaling action has been completed, and no further scaling actions are allowed until after it has expired.

As noted, in some implementations, a scaling policy may be stored as parameters in persistent storage, such as a data store. In other implementations, a scaling policy may be a document in data format such as eXtensible Markup Language (XML) or JavaScript Object Notation (JSON). An illustrative example of a policy document is shown below:

```
{
    "policyName": "MyServiceScalingPolicy1",
    "serviceNamespace": "MyService",
    "resourceId": "VMResourceGroup1",
    "scalableDimension": "NumVMs",
    "policyType": "StepScaling",
    "stepScalingPolicyConfiguration":
    {
        "adjustmentType": "PercentChangeInCapacity",
        "stepAdjustments": [
        {
            "metricintervalLowerBound": "10",
            "metricintervalUpperBound": "100",
            "scalingAdjustment": "5"
        }
```

-continued

```
        ],
        "minAdjustmentMagnitude": "1",
        "cooldown": "120",
    },
}
```

The scaling service 302 may also utilize a timeout. The timeout may serve at least two purposes. First, the scaling service 302 may utilize a timeout in a check alarm state workflow in an event that a scaling action becomes stuck for an excessive (i.e., greater than a defined threshold) period of time; for example, a service construct cluster that does not have enough capacity for new tasks may not respond to a demand to increase the number of tasks. In such an event, the alarm could remain in breach for a long time, and the timeout prevents the scaling service 302 from continually checking its state. Second, the scaling service 302 may prioritize scale-out/scale-up over scale-in/scale-down, but the scaling service 302 should not let a stuck scale-out/scale-up (e.g., due to an InsufficientCapacityException) prevent a scale-in/scale-down from occurring. Thus, a timeout may allow the scaling service 302 to unblock the scale-in. Note that in some implementations the timeout is user-configurable; whereas in other implementations the timeout is a user-non-configurable value which the scaling service 302 uses to determine whether to give up on a stuck scale-out.

The scaling service 302 may be designed as a layer on top of the resource services 304 that calls into those services on behalf of the customer 326. This ensures that the scaling service 302 provides the customer 326 with a consistent automatic scaling experience for all resource services. The customer 326 may first create an alarm, or the customer may choose an existing alarm, in a console of the telemetry service 306 and then apply a scaling policy to the alarm.

One scaling policy type is a "step" policy, which allows the customer 326 to define multiple steps of scaling adjustments with respect to the measurement that triggers execution of the scaling policy. For example, the customer 326 may specify to scale-up a scalable dimension of the resource if processor utilization reaches certain threshold steps. For example, the customer 326 may specify to scale-up the scalable dimension of the resource by 10 percent if processor utilization is between 30 and 60 percent. The customer may further specify to scale-up the scalable dimension by 30 percent if processor utilization is between 60 and 70 percent, scale-up the scalable dimension by 30 percent if processor utilization is above 70 percent, and so on. In this manner the customer 326 can define multiple steps and/or multiple responses with different magnitudes with respect to the specified metrics.

The API of the scaling service 302 may be designed to operate as a separate service from the resource services 304 such that it is not integrated into any particular service of the resource services 304. In this manner, the scaling service 302 is not dependent upon any particular service of the resource services 304. In order to set up a particular resource service to be scaled by the scaling service 302, the scaling service 302 simply needs information about the APIs of the particular resource service to call in order to direct the particular resource service to scale-up or down. The scaling service 302 is able to maintain this independence by specifying which dimension of which resource of the particular resource service to scale and whether to scale-up or down; the logistics of how the particular resource should be scaled (e.g., which tasks to terminate, which container instances that do tasks should be launched, etc.) in response to direction from the scaling service 302 is determined by the particular resource service itself.

In some embodiments, additional components not pictured in FIG. 3 are present within the scaling service 302. For example, in certain embodiments a control plane service is present between the scaling service workflow manager 324 and external services such as the authentication service 316 and the database service 320. For example, the control plane service may provide API operations for updating scaling history. Furthermore, having certain functions performed by the control plane instead of the scaling service backend 328 may mitigate performance impact if the scaling service backend 328 receives requests for many data retrieval operations from the customer 326. With a separate control plane, the effect on the scaling service 302 of the increased volume of retrieval operations is minimized. The control plane service may exist in addition to the backend service and may track and record all persistent service (e.g., database service 320, authentication service 316, etc.) interactions. In other embodiments, however, control plane functionality is integrated into the scaling service backend 328.

Also in some embodiments, service adapters are present within the scaling service 302 between the resource services 304 and certain scaling service components, such as the scaling service backend 328 and the scaling service workflow manager 324. The service adapters may be responsible for routing the scaling request through appropriate APIs for the target service. In alternative embodiments, the service adapter functionality is present within the scaling service workflow manager 324 and/or the scaling service backend 328. However, because the scaling service 302 is decoupled from the resource services 304, the scaling service 302 relies on a response from the particular resource service in order to determine whether a scaling request has been fulfilled.

The workflow service 322 may be a collection of computing devices and other resources collectively configured to perform task coordination and management services that enable executing computing tasks across a plurality of computing environments and platforms. The workflow service 322 may provide a workflow engine used to effect asynchronous changes in the scaling service 302. The workflow service 322 may be used to update target resources and may also be used as a lock to control concurrent scaling requests. The workflow service 322 may track the progress of workflow execution and perform the dispatching and holding of tasks. Further, the workflow service 322 may control the assignment of hosts or physical or virtual computing machines used for executing the tasks. For example, a user can define a workflow for execution such that the workflow includes one or more tasks using an API function call to the workflow service 322. Further, the user may specify task order for the workflow, conditional flows, and timeout periods for restarting or terminating the execution of the workflow. In addition, execution loops for the workflow may be defined. Workflow execution may be asynchronous and may be preceded by synchronous execution of database writes. Note that although FIG. 3 shows the workflow service 322 as residing external to the scaling service 302, it is contemplated that, in some embodiments, the functionality provided by the workflow service 322 may be found wholly or partially within the scaling service 302.

Interruption of the workflow service 322 may cause delayed scaling because the asynchronous processing of scaling requests may be adversely impacted. One way to mitigate delayed scaling may be to do only what is absolutely required to scale synchronously via the scaling service frontend 314. At a minimum, the scaling service may attempt to set desired capacity and record scaling history. From a performance standpoint, this may be acceptable because it just requires an API call to the resource service owning the resource to be scaled and a minimum of extra writes to the database service 320. Although this may result in losing features of workflow service 322 (e.g., retry mechanism, history tracking, etc.), at least the system will perform the operations that are required to scale.

The scalable targets (i.e., scalable resources) may reside with the resource services 304. A scalable target may be uniquely identified from the triple combination of service (e.g., service namespace), resource (e.g., resource ID), and scalable dimension. The resource services 304 represent the services that actually manage the resources that the customer 326 wants to be automatically scaled. In this manner, the scaling service 302 exists as a separate service from the resource services 304 whose resources are caused to be scaled by the scaling service 302. The resource services 304, as noted, may include services such as a software container service, a database service, a streaming service, and so on. The scaling service 302 may take the scaling policies created by the customer 326 and, when the scaling policies are invoked (e.g., by an alarm from the telemetry service 306), the scaling service 302 may perform the calculations to determine, given the particular policy and the current capacity of the resource, whether to increase or decrease the capacity to a new value. In order to get the current capacity of the resource, the scaling service backend 328 may make a service call to the resource service 304 of the resource to be scaled. In response, the resource service 304 may provide the scaling service 302 with the current capacity (e.g., "five tasks").

The scaling service workflow manager 324 may then make a service call to the resource service 304 that actually owns the resource to be scaled to cause the scaling action to be performed. In other words, because the scaling service 302 is a separate service from the resource service 304 that hosts the resources, the scaling service 302 will make service calls to the resource service that owns the resource in order to get the state of the resource and also to change the state of the resource.

The authentication service 316 may be a service used for authenticating users and other entities (e.g., other services). For example, when a customer of a computing resource service provider interacts with an API of the computing resource service provider, the computing resource service provider queries the authentication service 316 to determine whether the customer is authorized to have the API request fulfilled. In the process of creating a scaling policy, the customer 326 may assign the scaling service 302 to a role that authorizes fulfillment of certain requests, and the scaling service 302 may then assume that role in order to make appropriate requests to cause a resource service associated with the policy to scale resources. In this manner, the role (supported by a role management service) gives the scaling service 302 the necessary permission to access the resource that lives in the resource services 304.

The customer 326 may create a role supported by a role management service through an interface console. The interface console may allow the customer 326 to click an appropriate button or consent checkbox in the interface console, and the underlying system may create the role with the necessary permissions. The token service 318 may provide the scaling service 302 with session credentials based on a role or roles specified by the customer 326. These session credentials may be used by the scaling service 302 to interact with the resource services 304 on behalf of the customer 326. The token service 318 may provide a token to the scaling service 302 that the scaling service may include with requests that provide evidence that the scaling service 302 has been granted the appropriate role to cause scalable dimensions of a resource in the resource services 304 to be manipulated. The role may be utilized by the automatic scaling service to call a resource service's APIs on behalf of the customer 326.

Interruption of the token service 318 may result in the scaling service 302 being unable to assume a role supported by a role management service, with the scaling service 302 thereby being unable to scale a resource of the customer 326. In some embodiments, the scaling service 302 caches temporary credentials (e.g., they may be valid for 15 minutes, etc.) that the scaling service 302 can use when assuming a role.

As described in the present disclosure, the scaling service 302, itself, does not determine whether conditions that trigger a scaling policy are met. Rather, an external entity, such as the telemetry service 306, determines whether conditions have been met (e.g., by an alarm specified by the customer 326) and, if met, sends a notification to the scaling service 302 that triggers execution of the appropriate scaling policy. Thus, a scaling policy may be triggered by an alarm sent by this telemetry service 306, by the occurrence of an event that triggers notification from an external entity, on demand by the customer 326, according to a notification that is sent to the scaling service 302 according to a schedule, or by some other external notification.

As noted, in some embodiments the scaling service supports application scaling. In some examples, the term "application stack" may refer to a grouped set of resources, for example, for executing an application (e.g., comprising an application of the customer, such as a virtual machine from a virtual computer system service and a database from a database service). Through the scaling service interface, the customer 326 may group different resources together under a common name for scaling. For example, if the customer 326 has resources that use a database service, virtual computing system service, load balancing service, and a streaming service, the customer 326 may use a group scaling policy to scale-up or scale-down scalable dimensions of the resource of the group based on a particular trigger (e.g., alarm of the telemetry service 306). Based at least in part on the policy, the scaling service 302 knows which scaling commands to send to which service. In this manner, the customer can group together some or all of the customer's services/resources and perform scaling for that group of services as opposed to scaling resources individually. For example, a scaling policy triggered by a telemetry service alarm may specify to increase the group by three more database service instances, 10 more virtual machines, and four load balancers.

Additionally or alternatively, in some embodiments the scaling service 302 supports "target tracking metrics." In some examples, "target tracking metrics" may refer to measurements that the customer 326 wants to keep within a specific range. This simplifies the user experience because the customer 326 simply specifies the metric of a resource and the particular range, and the scaling service 302 determines how to scale the resource to keep the measurements within the particular range. For example, if the scalable dimension is processor utilization and the customer specifies to keep the scalable dimension between 40 and 60 percent, the scaling service 302 determines how to keep the measurements within this range. Consequently, the customer is spared having to define, for example, within a first range to scale-up by a first amount, within a second range to scale-up by a second amount, and so on.

Figure 4:
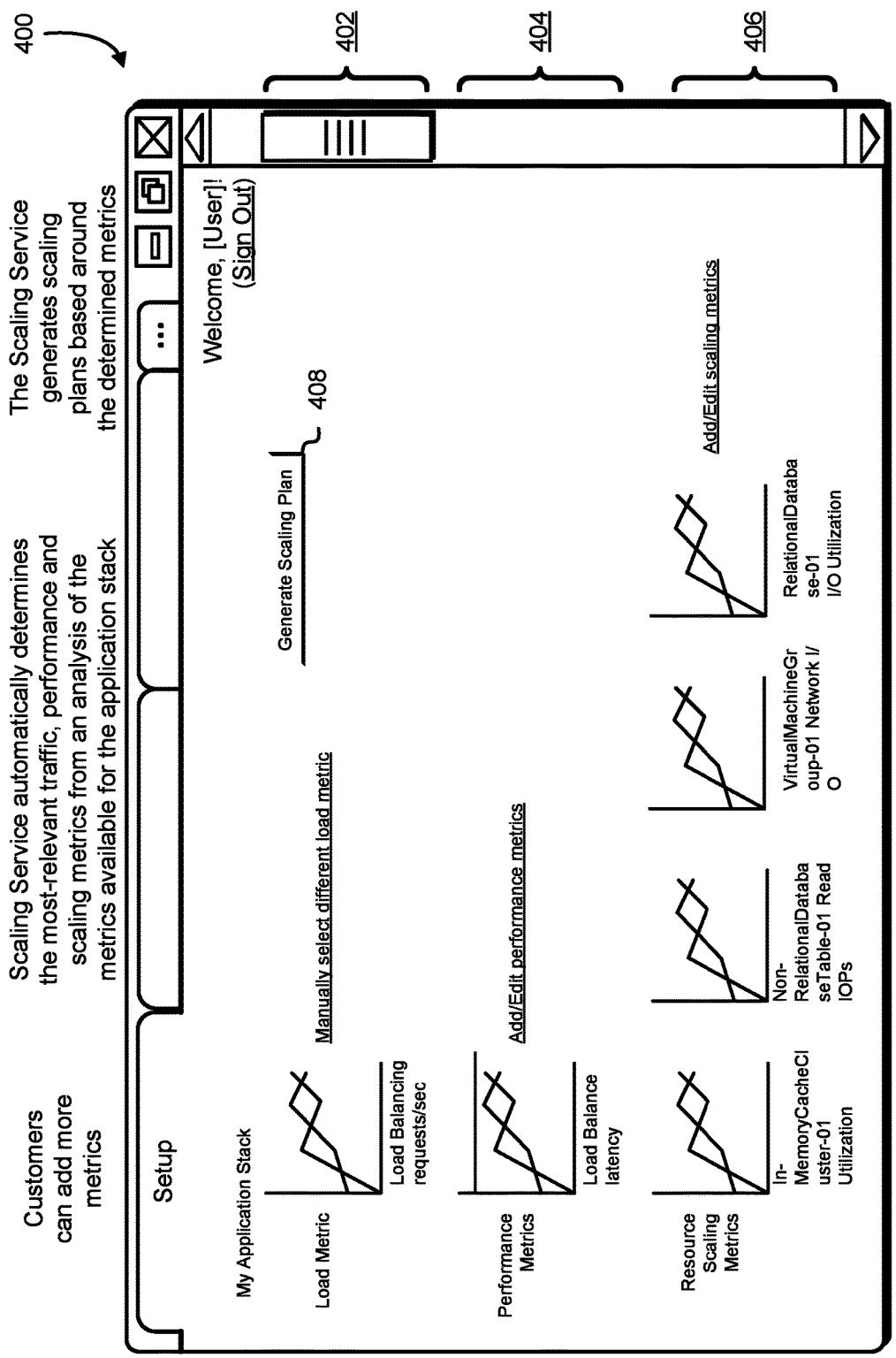
FIG. 4 illustrates an example of selecting application stack metrics in accordance with an embodiment.

FIG. 4 illustrates an illustrative example console 400 of an embodiment of the present disclosure. Specifically, FIG. 4 depicts a console that enables the customer to generate autoscaling plans based on historical data. The scaling service, such as the scaling services 110 and 210 of FIGS. 1 and 2, analyzes historical data about the application stack to determine the relationship between load, performance, and scaling metrics. In some cases, the scaling service may present load metrics, performance metrics, and resource scaling metrics that it estimates to be the most relevant for scaling and allowing the customer to add, remove, or edit such metrics.

As can be seen in FIG. 4, the console 400 allows the customer to select different load metrics 402, such as the load metric of load balancing requests per second. Likewise, the console 400 allows the customer to select, add, or edit particular performance metrics 404, such as load balance latency. Similarly, the console 400 allows the customer to select, add, or edit resource scaling metrics 406 such as cluster utilization, read IOPs, network I/O, or database I/O utilization. The customer can begin generation of scaling plans by clicking the button 408, which may cause the console 400 to display the console 500 of FIG. 5. Note that the example console 400 is intended to be illustrative, and it is contemplated the number and types of fields and elements in the console may vary based on the particular implementation. Furthermore, it is contemplated that other input methods and other interfaces, in addition to or alternative to the example console 400, are possible, and that users may exercise control over devices and interfaces in a variety of ways such as tapping, gesturing, tilting, slighting, pressing, pinching, blinking, and depressing.

To begin, the customer may specify the application stack having multiple resource types to the computer resource service provider. Specifying the application stack enables the computer resource service provider to determine, based on the resource types within the application stack, which resource types to analyze. Different resource types may have their own set of metrics that can be tracked. Thus, in order for the scaling service to recommend a scaling policy to the customer, the customer or the scaling service needs to determine which metric to use for setting alarm criteria. In an example, a customer has a group of software containers in his/her application stack. For this set of resources, CPU utilization is one metric that can be affected by scaling the group of software containers out or in. That is, the larger the group of software containers, the lower the average CPU utilization is for a given load. Conversely, the smaller the group of software containers is, the higher the average CPU utilization is per machine for the same load. This type of metric may be referred to as a "signal carrying metric." That is, the metric could be used to determine whether to scale or not, and scaling has a causal effect on the metric.

In some examples, a "software container" (also referred to simply as "container") may be an isolated user space instance. That is, a software container may be a virtualized instance running under a computer system instance that includes programs, data, and system libraries. A difference between a software container and a virtual machine may be that, while the hypervisor of a virtual machine abstracts an entire hardware device, the software container engine may just abstract the operating system kernel. While software containers run in isolation from each other, they can share the same binaries and library files as needed. Consequently, the software container can be more efficient than a virtual machine in terms of resource usage. In an environment where a customer needs to run multiple copies of the same application, more applications can be run simultaneously in software containers than running the applications simultaneously in separate virtual machines using the same hardware.

The scaling service may use machine-learning techniques to determine, based on historical data, the optimal signal carrying metric to use for scaling the resource type. In some cases, the historical data may be historical data for the particular resource of the customer. In other cases, such as where not enough historical data exists for the particular resource of the customer to make a determination of the optimal signal carrying metric with sufficient certainty, the scaling service may determine the optimal signal carrying metric based on historical data of other customers having application stacks similar to the customer. Such machine learning techniques may include supervised learning techniques, unsupervised learning techniques, semi-supervised learning techniques, transduction or transductive inference techniques, reinforcement learning, developmental learning, and the like. In various embodiments, the data may be analyzed using one or more machine learning algorithm, such as: decision trees, association rule learning, deep learning, inductive logic programming, support vector machines, cluster analysis, Bayesian networks, naïve Bayes classifiers, learning automata, Gaussian process regression, nearest neighbor, random forest, ordinal classification, k-means clustering, lazy learning, artificial neural network, or generally any suitable machine learning algorithm or combination of algorithms. For example, set of decision trees can be generated from historical data by splitting the historical data into subsets based on an attribute value test and partitioned recursively until the splitting no longer adds value to the predictions. The types of resources, capacity of resources, and scaling plans can be fed into the set of decision trees as input, and the set of decision trees may output estimated optimal signal carrying metrics and/or target scaling thresholds and baselines.

The optimal signal-carrying metric is likely to be a metric that has a strong causal relationship with the capacity of the resource that needs to be scaled; that is, it may be a metric that upon scaling up or down (or in or out) the capacity of the resource, the measurements associated with the metric should consistently change in response. That is, it should be determinable that if an alarm threshold is set to a certain value, and measurements corresponding to the metric exceed that value, scaling the capacity of the resource with the relationship to the metric should bring the measurements corresponding to the metric to a level that achieves a goal (e.g., low latency, low cost, etc.) of the customer.

Next, the scaling service may determine the relationships among the resources in the application stack so as to determine whether multiple scaling policies (e.g., one per resource) are to be recommended, that is, if the signal-carrying metric exceeds a particular threshold, whether resources of multiple resource types should be scaled (and how). Determining relationships between resources may be based on traffic volume data for the resource of the application stack. The determination may be more accurately made by analyzing both high volume and low volume periods. For example, if, when resources of a first resource type experience a high traffic volume, resources of a second resource type tend to also experience a high traffic volume, and conversely when resources of the first resource type experience a low traffic volume and at the same time resources of the second resource type also experience a low traffic volume, the scaling service may determine that the resource utilization for the first resource type and resource utilization for the second resource type are related.

As an example, if CPU utilization for a group of virtual machines in the application stack appears to inversely track IOPS for a relational database table also in the application stack, the scaling service determines that the utilization of the group of virtual machines is related to the utilization of the relational database table. This determination suggests that the group of virtual machines and the relational database table should be scaled in tandem, possibly based on the CPU usage or IOPS achieving a value relative to a threshold (e.g., above or below). For example, as a result of determining that the group of virtual machines and the relational database should be scaled in tandem, a scaling policy for the group and a scaling policy for the relational database, and one or more telemetry alarms could be set to invoke both scaling policies as a result of CPU utilization exceeding 45%. Likewise, resource utilization for different resource types may be determined to be related, but it may not be desirable to scale both resource types at the same time or based on the same trigger. For instance, although the CPU utilization of a group of virtual machines may be related to utilization of a relational database table, it may not be desirable to scale the relational database resource at the same time as when the group of virtual machines does. For example, in such a case, scaling policies may be configured to scale the virtual machine group may scale as a result of CPU utilization reaching 45%, and scale the related relational database resources as a result of CPU utilization reaching 60%.

Figure 5:
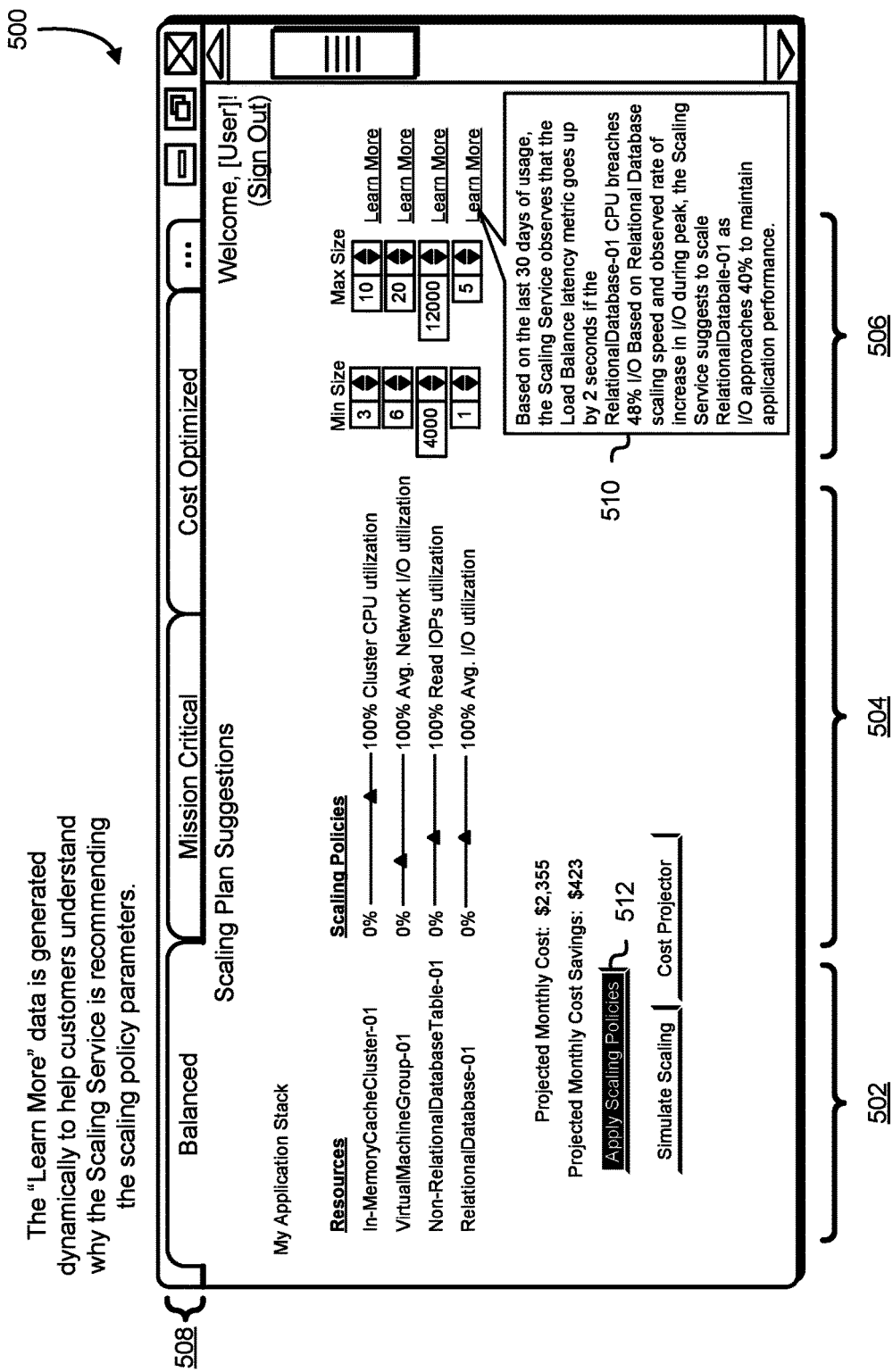
FIG. 5 illustrates an example of scaling plan recommendations in accordance with an embodiment.

FIG. 5 illustrates an illustrative example console 500 for an embodiment of the present disclosure. Specifically, FIG. 5 depicts a console that presents scaling suggestions/recommendations to a customer for their application stack. The computing resource service provider may have a number of default scaling plan options, and in some embodiments the customer can further customize the scaling policy options or create a scaling policy from scratch. In some examples, a "scaling plan" may refer to parameters and parameter values to be input into algorithms that determine alarm thresholds and/or other events that can trigger scaling policies to be executed. The scaling plans may be represented graphically, as seen in FIG. 5, or textually. A number of default scaling plans 508, such as "balanced," "mission critical," and/or "cost optimized," are shown in FIG. 5. As can be seen from the tabs, the customer has selected a "balanced" scaling plan. The balanced scaling plan may cause the scaling service to compute alarm criteria (e.g., thresholds) in a manner that achieves a balance between cost and performance.

A mission-critical scaling plan may compute alarm criteria that prioritize performance over cost. For example, the mission-critical scaling plan may present, by default, more aggressive metrics than the balance or cost-optimized plans, or select default thresholds that would cause the scaling service to scale more aggressively than the balanced or cost-optimized plans. For example, thresholds may be set lower than the balanced or cost-optimized plans (e.g., a lower CPU utilization, network I/O utilization, or IOPS utilization threshold) for scaling up and scaling out resources and set higher than the balanced or cost-optimized plans for scaling down and scaling in resources. In this manner, the scaling service ensures that more resources are available to perform mission critical operations.

Converse to the mission-critical scaling plan, the cost-optimized scaling plan may compute alarm criteria that prioritize cost savings over performance. For example, the cost-optimized scaling plan may present, by default, more conservative metrics than the balance or mission-critical plans, or select default thresholds that would cause the scaling service to scale more conservatively than the balanced mission-critical plans. For example, thresholds may be set higher than the balanced or cost-optimized plans (e.g., a higher CPU utilization, network I/O utilization, or IOPS utilization threshold) for scaling up and scaling out resources, and set lower than the balanced or cost-optimized plans for scaling down and scaling in resources. Consequently, the cost-optimized scaling plan may save costs by scaling only when absolutely necessary. It is contemplated, however, that any number of default scaling plans may be possible, each with a different objective for the customer.

As discussed in the present disclosure, the scaling service may also suggest predictive scaling policies (not shown). The scaling plan selected may also affect the recommendations for predictive scaling policies. For example, for a cost-optimized scaling plan, the scaling service may suggest more conservative predictive scaling policies, whereas for a mission-critical scaling plan the scaling service may suggest more aggressive predictive scaling policies. For example, a more aggressive predictive scaling policy may scale up/out by a higher magnitude and/or scale down/in by a lower magnitude than a conservative predictive scaling policy. Likewise, for a balanced scaling plan the scaling service may suggest predictive scaling policies that attempt to achieve a balance between cost and performance/availability.

The resources 502 comprise the application stack of the customer. As can be seen, the application stack utilizes four services: an in-memory cache service, a virtual computing system service, a non-relational database service, and a relational database service. In the present disclosure, an in-memory cache service may be a distributed in-memory cache environment for providing general-purpose distributed memory caching. The in-memory cache service may improve performance of applications by caching data in fast, in-memory caches to reduce the number of times and external data source (e.g., database) must be read. An in-memory cache service may include cache clusters comprising cache nodes.

Also in the context of the present disclosure, a virtual computer system service may be that may be a collection of computer resources used by a computing resource service provider to provide virtual machine instances for customers. The virtual computer system service may provide such virtual machine instances by instantiating the virtual machine instances on physical hardware. The physical hardware may include physical hosts which may include any device or equipment configured to execute instructions for performing data computation, manipulation or storage tasks, such as a computer or server similar to the client device 1002 and the application server 1008 described in conjunction with FIG. 10. The customer may interact with the virtual computer system service to provision, place and operate virtual machine instances that are instantiated on physical computer devices hosted and operated by the computing resource service provider. The virtual machine instances may be used for various purposes, such as to operate as servers supporting a website, to operate business applications or, generally, to serve as compute power for the customer. Other applications for the virtual machine instances may be to support database applications, web applications, and/or other applications.

A relational database service may be a service that provides an organized collection of data, such as tables, queries, reports, views, and other objects based on a relational model of data, whereby data is represented in terms of tuples, grouped into relations. Relational databases may use a structured query language (SQL) for managing and processing data in the database tables. A non-relational database service may be a service that provides an organized collection of data, such as tables, queries, reports, views, and other objects modeled in a manner other than tabular relations used in relational databases.

The scaling policy sliders 504 allow the customer to adjust alarm thresholds for the scaling policy corresponding to the particular resource. The console 500 also includes min/max controls 506 for setting a floor and ceiling (minimum and maximum) that the scaling service cannot scale above or below. The scaling policy sliders 504 and the min/max controls 506 may be set to default values based on scaling policy recommendations for the particular scaling plan selected, which in implementations are adjustable/customizable by the customer.

As can be seen, the customer can adjust the cluster central processing unit (CPU) utilization for the in-memory cache cluster from 0 to 100% and adjust the minimum and maximum (which are currently set at three and 10 respectively). Similarly, the customer can adjust average network I/O utilization for the virtual machine group from 0 to 100% and adjust its minimum and maximum (which are set to a minimum of six and a maximum of 20). Likewise, the customer can adjust read input/output operations per second (IOPS) utilization for the non-relational database table from 0 to 100% and adjust its minimum and maximum values (which are set to 4,000 and 12,000 respectively). Finally, the customer can adjust average I/O utilization for the relational database from 0 to 100% and adjust its minimum and maximum (currently set at one and five, respectively).

The "Learn More" dialogue 510 may provide the customer with an explanation of the scaling policy recommendations for each of the resources 502 of the application stack. As can be seen, for the relational database recommendation the scaling service has analyzed 30 days' worth of usage data for the relational database and determined that load balance latency increases by two seconds if the CPU breaches 48% I/O. Consequently, the scaling service recommends scaling the relational database service if average I/O utilization exceeds a 40% threshold. Note that the example console 500 is intended to be illustrative, and it is contemplated the number and type of fields and elements in the console may vary based on the particular implementation. Furthermore, it is contemplated that other input methods and other interfaces, in addition to or alternative to the example console 500, are possible, and that users may exercise control over devices and interfaces in a variety of ways, such as tapping, gesturing, tilting, slighting, pressing, pinching, blinking, and de-pressing.

After the customer has selected values for the parameters in the console 500, the computing resource service provider may make calls to various application programming interfaces to set up the alarms in a telemetry service and store the scaling policy parameters (e.g., via PutScalingPolicy( ) as described in U.S. patent application Ser. No. 15/194,479, entitled "VERSATILE AUTOSCALING," filed on Jun. 27, 2016, and U.S. Provisional Application No. 62/337,809, filed on May 17, 2016, entitled "VERSATILE AUTOSCALING") in a data store of the scaling service. As an example, if the customer clicks the "Apply Scaling Policies" button 512, the system of the computing resource service provider providing the console 500 would create a telemetry service alarm that triggers if cluster CPU utilization for the in-memory cache cluster rises above 70%, create a telemetry service alarm that triggers if average network I/O utilization for the virtual machine group rises above 30%, create a telemetry service alarm that triggers if read IOPS utilization for the non-relational database table rises above 45%, and create a telemetry service alarm if average I/O utilization for the relational database rises above 45%. The console 500 thereby obviates the necessity of the customer to interact with the API directly. Instead, the system behind the console 500 calls the API's parameters selected through the interface. Thus, the console 500 is a graphical representation of those parameters.

The console 500 depicts a console for metric-based scaling. In metric-based scaling, the customer identifies a metric, a threshold for triggering an alarm, and a scaling adjustment to perform in response the alarm being triggered. However, in many cases the customer may simply want to maintain resource utilization at a particular level. In some embodiments, the customer can implement a target tracking scaling policy. In the context of a scaling policy, "target tracking" may refer to performing the necessary scaling adjustments to maintain a performance metric at a particular level. With target tracking, the customer provides a target range or desired level for a particular performance metric and the scaling service determines how much scale up or down (or in or out) to maintain the particular performance metric within the target range or at the desired level.

It is contemplated that there are variety of methods for determining how much to scale. One method is a proportional scaling method whereby the difference between the current measurement of the metric and the target value causes the scaling service to scale resources by a similar proportion. As an example, if a current measurement differs from the target value by 20%, the scaling service would scale up, down, in, or out (as applicable) by 20 percent also. Many types of metrics may be used in target tracking. In another example, a customer has set a target tracking value for CPU utilization at 50% and a current measurement of CPU utilization is 75%. In this example, 75% is 50% over the 50% target value. Thus, the scaling service using this method of proportional scaling may compute a new capacity for the scalable resource (e.g., virtual machine group) to add 50% more to the resource dimension (e.g., number of virtual machines in the virtual machine group).

Another target tracking method is rate-of-change scaling. With rate-of-change scaling, the scaling service analyzes the rate-of-change of the measurements and determines a new capacity to account for an anticipated change in resource utilization. For example, if the measurement is trending away from the target level, the scaling service may compute a new capacity that increases the current capacity by an amount based on the rate-of-change for the trend in the measurements.

For target tracking scaling, resource types may be associated with the same target value. For example, if the customer has indicated a target value for a particular usage metric, and the application stack includes multiple resource types with a performance relationship to the tracked metric (i.e., increasing or decreasing resources of the multiple resource types has a measurable effect the tracked metric), the scaling service may create scaling policies for each of the multiple resource types that specify how to compute (e.g., proportionally according to a rate-of-change or according to some other algorithm) a scaling amount based on an amount of variation between the target value and a current measurement of the tracked metric. In this way, for resources that typically need to be scaled in tandem (e.g., a virtual machine group and a relational database), the scaling service can recommend policies that cause such resources to be scaled together.

Tandem scaling may involve multiple policies (e.g., one for each resource to be scaled) that, as a result of a breach of a threshold, multiple scaling policies are invoked. Note that the policies need not be invoked by a breach of the same threshold, for example, if the customer specifies to maintain CPU utilization of a virtual machine group at 50% and the scaling service determines that, when the virtual machine group is at 50% CPU utilization, a relational database associated with the virtual machine group experiences a consumption rate of 45%. In this example, the scaling service recommends two scaling policies: one scaling policy that scales the virtual machine group if CPU utilization exceeds 50% and another scaling policy that scales the relational database group if consumption exceeds 45%. Given the determined relationship between the two usage rates, both scaling policies are likely to be invoked at approximately the same time. Having different scaling policies that trigger on different usage thresholds for different resources allows flexibility, for example, in cases where for some reason one resource has a very high load but does not impact the other resource; in this manner, the resources would scale independently.

It is also contemplated that, in some implementations, a single scaling policy can have all the information needed to scale multiple resources. In one example, if CPU utilization exceeds 50%, the scaling policy directs the scaling service to increase compute (e.g., processor) capacity by 25%, increase relational database table read IOPS by 10%, and increase the size of the database table by 10%. In a second example, if IOPS of the relational database table fall below 40% of target, a second scaling policy directs the scaling service to increase compute capacity by 10% and increase the relational database table size by 10%. In a third example, if read throughput of the relational database exceeds 30% of a target throughput, a third scaling policy may direct the scaling service to reduce the relational database table read IOPS by 40%, and decrease compute capacity by 10%.

Moreover, it is also contemplated that the telemetry alarms may trigger based on more complex conditions than exceeding a single threshold or falling below a single baseline. For example, in some implementations a telemetry alarm may be configured to trigger on a condition that both CPU utilization exceeds a certain threshold and read IOPS falls below a certain baseline. Likewise, a telemetry service alarm may be configured to trigger on a condition that either CPU utilization falls below a certain threshold or relational database read throughput falls below a certain threshold. It is contemplated that various combinations of computational logic (e.g., "and," "or," "not") and operation orders (e.g., parentheses or brackets indicating the order of logical determination) can be specified within the scaling policies described in the present disclosure.

In some implementations, related scaling policies can be sequenced. For example, for two scaling actions that are invoked at approximately the same time, it may be preferable for one scaling action to complete before the other. As an example, if a virtual machine group that outputs data to a relational database is scaled out before the relational database is scaled up, the virtual machine group could be placing additional load on the relational database before the relational database is ready for the load. However, if the policies are sequenced such that the relational database is scaled up before the virtual machine group is scaled out, the relational database will be better prepared for the additional load. Sequencing policies may be performed in various ways, such as by the scaling service analyzing the currently invoked scaling policies and determining priorities based on resource type. Resource types with lower priority may be paused until scaling actions of higher priority scaling policies are successfully completed.

In some implementations, a scaling policy itself can be configured to trigger execution of another scaling policy, such as upon completion of the scaling action of the first scaling policy. For example, a first scaling policy is triggered at a certain CPU utilization threshold and, upon completion of a scaling action of the first scaling policy, a second scaling policy is triggered to perform a different scaling action. In this manner, scaling actions may be chained. Additionally or alternatively, in some implementations the first scaling policy can also include the information usable by the scaling service (e.g., scaling action to perform to which scalable resource) to perform a different scaling action such that multiple scaling actions can be determined from only a single scaling policy.

Figure 6:
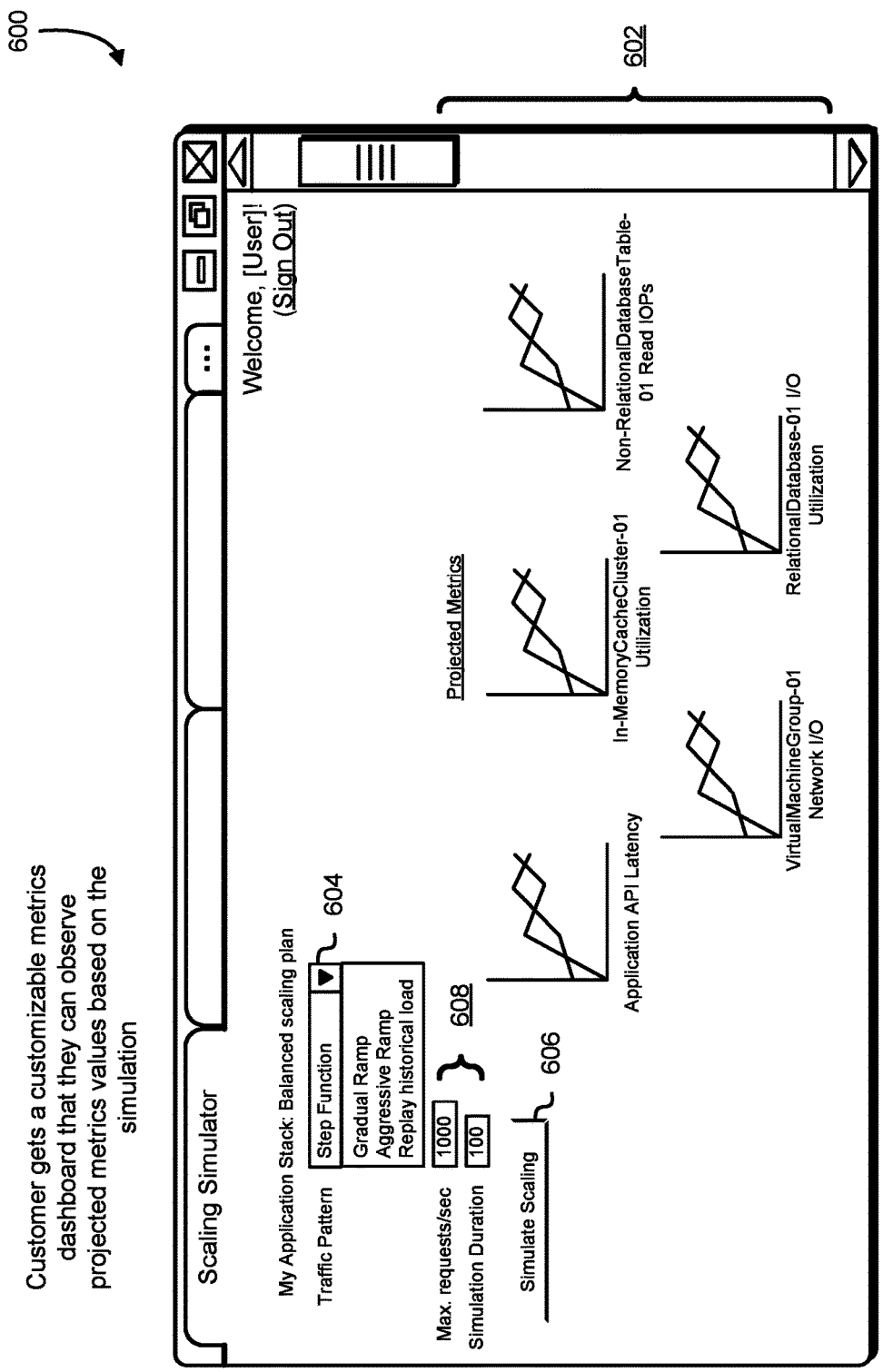
FIG. 6 illustrates an example of a scaling simulator in accordance with an embodiment.

FIG. 6 illustrates an example console 600 of an embodiment of the present disclosure. Specifically, FIG. 6 depicts a dashboard for displaying a simulation based on the scaling plan/policies selected and finalized by the customer in the console 500 of FIG. 5. As can be seen in FIG. 6, the console allows the customer to select a load metric pattern 604 (e.g., a step function, gradual ramp, aggressive ramp, replay a historical load, etc.) and fields 608 for specifying a maximum number of requests per second (e.g., 1000) being made to the application stack and a simulation duration (e.g., 100 milliseconds). The customer may generate simulated measurements 602 based on the settings by clicking the simulate scaling button 606. In this manner, the customer can determine, at a glance, the effect of the selected scaling plan on the performance and/or cost of the application stack under a variety of loads. From this, the customer can decide whether or not the selected scaling plan achieves the result desired by the customer for the application stack.

In an illustrative example, a customer logs into a console for the scaling service and requests to optimize an application stack. The scaling service responds by displaying the console 400 of FIG. 4. The console 400 displays a suggested set of metrics for use in scaling that the scaling service has determined after analyzing the resources in the application stack; i.e., the scaling service has suggested a load metric of load balancing requests per second, a key performance metric of load balance latency and, for resource scaling metrics, virtual machine group CPU utilization and relational database table read IOPS. Satisfied with these metrics suggestions, the customer continues to console 500 of FIG. 5, whereupon the scaling service displays three scaling plans for the application stack ("Balanced," "Mission Critical," and "Cost Optimized").

For the balanced plan, the scaling service determines, based on an analysis of the historical data, that low demand during weekdays occurs between 6:30 PM to 6:30 AM and high demand during weekdays occurs between 6:30 AM to 6:30 PM. Consequently, the scaling service recommends a minimum of three virtual machine instances in the virtual machine group of the application stack to support the application stack during periods of low demand and recommends a minimum of 10 virtual machine instances to support the application stack during periods of high demand as a balance between cost and performance. Also in this illustrative example, the scaling service recommends a scaling policy configured to keep read IOPS of the relational database table at 50%. In addition, the scaling service determines that when average requests per minute of the application stack drops below 3,000 requests per minute, CPU utilization averages 30%; as a result, the scaling service recommends to keep the target CPU utilization of the virtual machine group between 40% to 50% by using a target tracking scaling policy to reduce the number of virtual machine instances in the virtual machine group when average requests per minute of the application stack drops below 3,000 requests per minute. In contrast, the cost-optimized scaling plan suggests simply using a target tracking scaling plan to keep the average CPU utilization of the virtual machine group between 50% and 60%.

In this illustrative example, the customer considers the application stack to be critical to revenue generation, so the customer selects a scaling plan that prioritizes performance over cost (e.g., "Mission Critical"). The customer selects to use the scaling simulator, (the console 600 depicted in FIG. 6) to get an idea how the application stack will scale using the mission critical plan. In the console 600, the customer can choose from a variety of load metric patterns 604. For example, in the console 600 the customer can select from a step function, a gradual ramp pattern, an aggressive ramp pattern, or replay a historical load. In this case, a step function refers to scaling by a fixed amount, and then staying at that capacity for certain amount of time before scaling by the fixed amount again, and so on. A gradual ramp pattern would be a linear (e.g., constant slope) pattern of values over time. An aggressive ramp pattern would, like the gradual ramp pattern, be a linear pattern of values over time but with a higher slope than the gradual ramp pattern. However, it is contemplated that other simulation patterns and/or other load metrics could be used additionally or alternatively. The console 600 also provides fields 608 for specifying the maximum number of requests per second and duration for the simulation. In this illustrative example, the customer selects to replay a historical traffic volume and clicks the simulate scaling button 606 to display the simulated measurements 602. The customer notes that where historically the relational database I/O utilization would reach maximum utilization during traffic volume spikes, the relational database I/O utilization under the mission critical plan would continue to scale up to meet demand.

Note that the example console 600 itself is also intended to be illustrative, and it is contemplated the number and type of fields and elements in the console may vary based on the particular implementation. Furthermore, it is contemplated that other input methods and other interfaces, in addition to or alternative to the example console 600, are possible, and that users may exercise control over devices and interfaces in a variety of ways, such as tapping, gesturing, tilting, slighting, pressing, pinching, blinking, and depressing.

Figure 7:
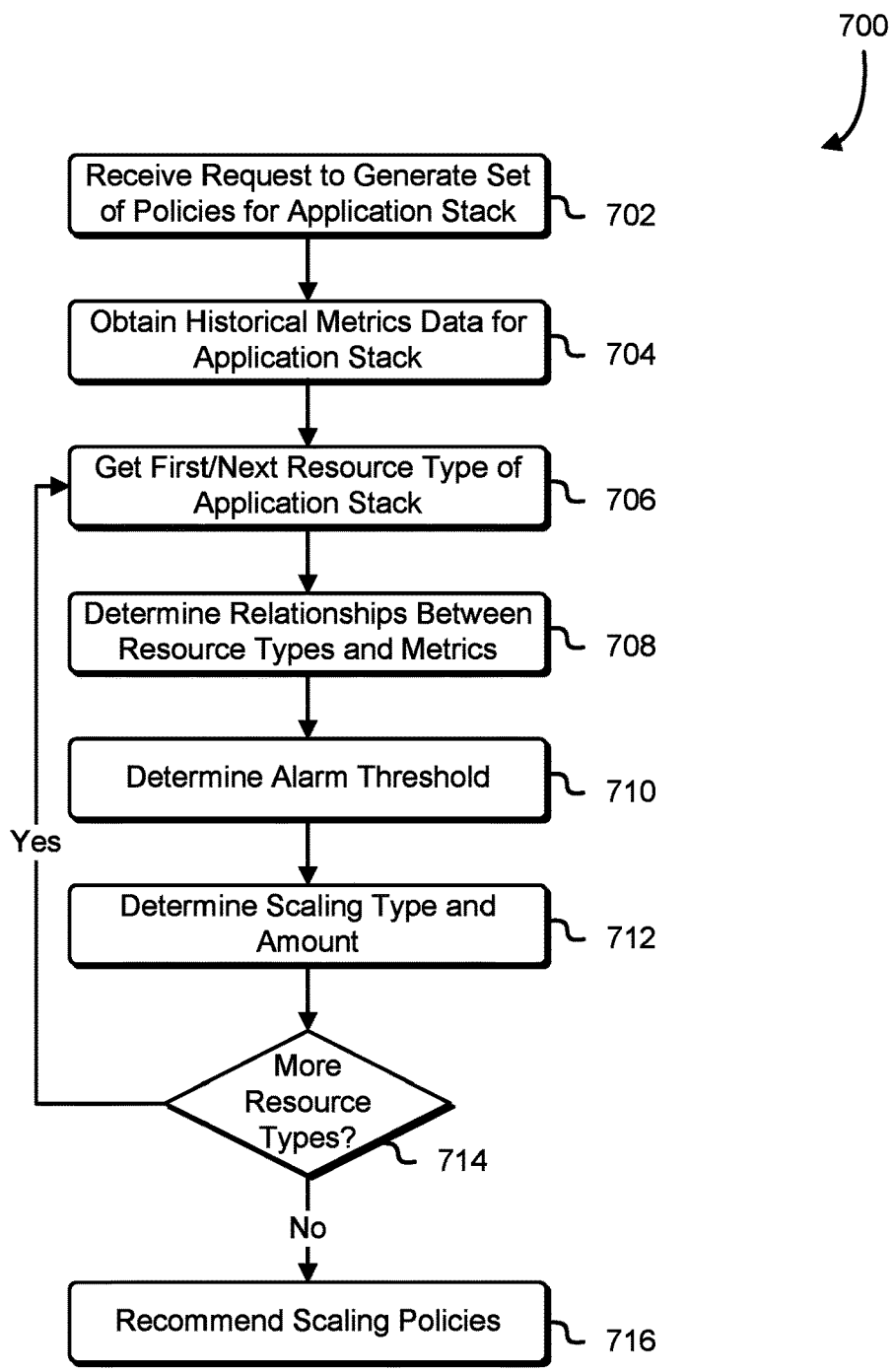
FIG. 7 is a flowchart that illustrates an example of recommending scaling policies in accordance with an embodiment.

FIG. 7 is a flowchart illustrating an example of a process 700 for recommending scaling policies in accordance with various embodiments. Some or all of the process 700 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

Figure 10:
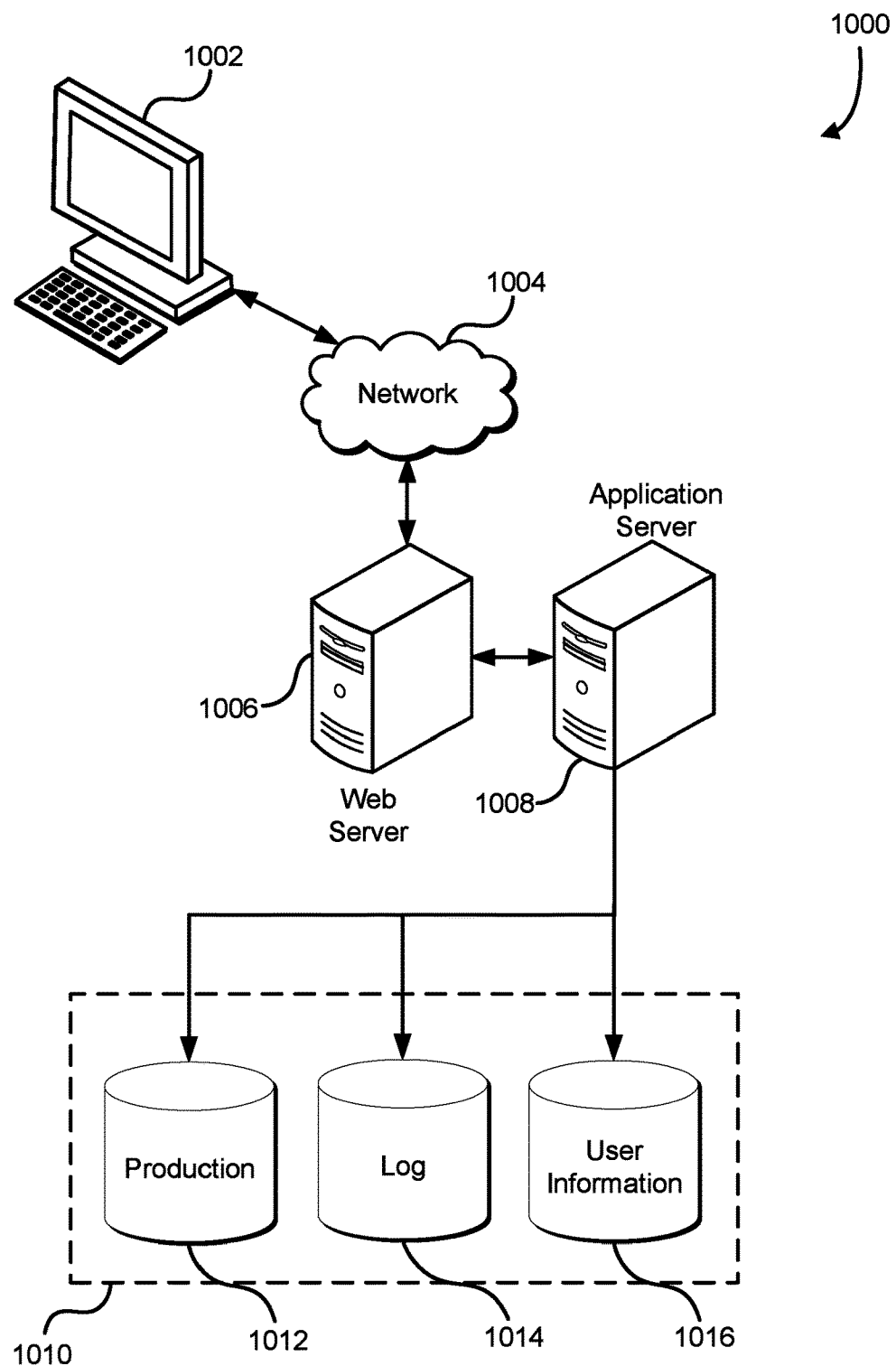
FIG. 10 illustrates an environment in which various embodiments can be implemented.

For example, some or all of process 700 may be performed by any suitable system, such as a server in a data center, by various components of the environment 1000 described in conjunction with FIG. 10, such as the web server 1006 or the application server 1008, by multiple computing devices in a distributed system of a computing resource service provider, or by any electronic client device such as the electronic client device 1002. The process 700 includes a series of operations wherein the scaling service analyzes historical transaction data for an application stack, determines relationships between resources of the application stack and between key metrics of the application stack, and generates recommended scaling policies based on a scaling plan selected by a customer.

In 702, the system receives a request to generate one or more recommended policies for an application stack. For example, the request may be received as a result of a customer of a computing resource service provider clicking the button, such as the button 408 of FIG. 4, selecting a scaling plan, such as the scaling plans 508 of FIG. 5, invoking generation of the recommended policies through a command line interface or application programming interface enabled through a software development kit, or some similar process.

In 704, the system performing the process obtains historical data about the metrics and the resources of the application stack. That is, a telemetry service may be receiving measurements corresponding to various resource and utilization metrics and storing such measurements in a transaction log data store. The telemetry service may store the received measurements as data in a database. In some implementations, in cases where the application stack has not been running long enough to accumulate enough historical data from which to determine correspondences between the resources and the metrics, the system will consult historical data of other customers having application stacks similar to the present customer (e.g., similar resource types, similar scale, similar network traffic, etc.). Such data may lend itself to statistical and probability analysis to determine interrelationships between resource types. Statistical analysis of the measurement data of various resources of the application stack using regression analysis (e.g., linear regression, nonlinear regression, Bayesian methods, least absolute deviations, nonparametric regression, etc.) or some such similar method may lead to the identification of correlations between different resource types. Such correlations may identify potential resource types that should be scaled in tandem. The choice of the method to use for identifying the correlations/relationships between resource types may depend on a variety of factors, including the size of the application stack, time-critical nature of the analysis, the types of measurements, and so on.

For example, in 706, the system may begin iterating through the different resource types of the application stack (such as the resources 502 shown in FIG. 5), and in 708 the system may determine, based on the historical data, how the resource type currently being analyzed reacts to different load metric values (see load metrics 402 of FIG. 4) or whether resource scaling metrics of the resource type currently being analyzed follow a similar pattern to other resource scaling metrics (see resource scaling metrics 406) or to performance metrics (see performance metrics 404).

Using the determined correlations, in 710 the system performing the process 700 may calculate alarm thresholds, such as the thresholds (e.g., trigger values depicted by the default values of the sliders 504 of FIG. 5). The system can utilize the threshold criteria for a telemetry service alarm with a telemetry service receiving measurements corresponding to the associated resource metric. The thresholds may be weighted according to a specified goal of the customer, such as by selecting from different scaling plan options such as depicted by the scaling plans 508.

In 712 the system may determine a scaling type (e.g., step, proportional, etc.) and an amount to scale (e.g., how many units to scale up/down/in/out each time) upon the triggering of an alarm threshold. Also in 712, the system may determine other policy parameter values, such as a scaling direction (e.g., up, down, in, out, etc.), minimum and maximum capacities (such as depicted by the min/max controls 506 of FIG. 5), cooldown time (e.g., a period of time since the previous scaling action that, if still in effect when the same scaling policy is triggered again, affects the computed new capacity), and so on.

In 714, the system performing the process 700 determines whether it has evaluated all of the resource types of the application stack. If not, the system may return to 706 to analyze the next resource type in the application stack. Otherwise, if the system has evaluated all of the resource types of the application stack and generated suggested scaling policies, the system may present the recommended scaling policies to the customer for approval or modification, such as in an interface like the console 500 of FIG. 5. Note that one or more of the operations performed in 702-20 may be performed in various orders and combinations including in parallel. For example, the operations of 706-12 may be performed in parallel instead of iteratively.

Figure 8:
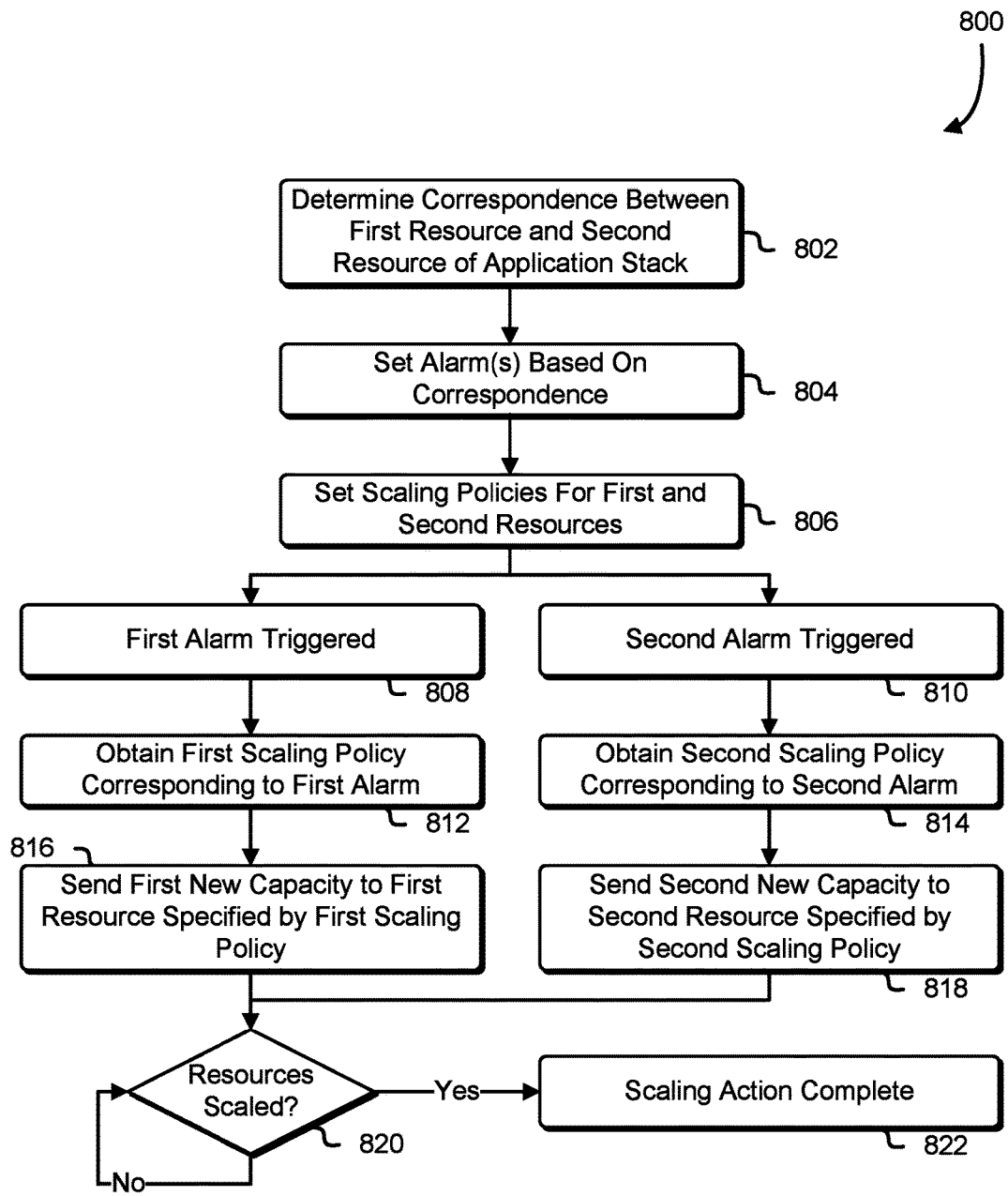
FIG. 8 is a flowchart that illustrates an example of tandem scaling in accordance with an embodiment.

FIG. 8 is a flowchart illustrating an example of a process 800 for tandem scaling in accordance with various embodiments. Some or all of the process 800 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as a server in a data center, by various components of the environment 1000 described in conjunction with FIG. 10, such as the web server 1006 or the application server 1008, by multiple computing devices in a distributed system of a computing resource service provider, or by any electronic client device such as the electronic client device 1002. The process 800 includes a series of operations wherein a correspondence/relationship between a first resource in second resource is determined, alarm criteria is set, scaling policies are generated, and the first and second resources are scaled in tandem as a result of the alarm criteria being met.

In 802, the system determines, based on historical data, that there is a relationship between utilization of the first resource of a first resource type and utilization of the second resource of a second resource type, different from the first resource type, in an application stack. That is, in a system of the present disclosure, a telemetry service may be receiving measurements corresponding to various resource and utilization metrics and storing such measurements in a transaction log data store. The telemetry service may store the received measurements as data in a database. Such data may lend itself to statistical and probability analysis to determine interrelationships between resource types. Statistical analysis of the measurement data of various resources of the application stack using regression analysis (e.g., linear regression, nonlinear regression, Bayesian methods, least absolute deviations, nonparametric regression, etc.) or some such similar method may lead to the identification of correlations between different resource types. Such correlations may identify potential resource types that should be scaled in tandem. The choice of the method to use for identifying the correlations/relationships between resource types may depend on a variety of factors, including the size of the application stack, time-critical nature of the analysis, the types of measurements, and so on.

With recourse to the transaction log data store, the system performing the process 800 can determine relationships between load metrics (e.g., load balance request count, network traffic volume, etc.), performance metrics (e.g., load balance latency metrics, etc.) and resource utilization metrics (e.g., average CPU utilization, relational database provisioned IOPS, etc.). For example, the system can determine whether a rise or fall in a load metric tends to precede a similar rise or fall in resource utilization of resources of a first resource type, and likewise tends to precede a similar rise in resource utilization of resources of a second resource type. As an example, if a rise in network traffic volume (load metric) precedes a rise in CPU utilization of a virtual machine group and a rise in relational database I/O utilization, and likewise a drop in the network traffic volume precedes a drop in the CPU utilization of the virtual machine group and a drop in the relational database I/O utilization, a determination may be made that there is a correlation between the virtual machine group and the relational database. Furthermore, the system can also make a determination that there is a correlation between network traffic volume, CPU utilization and database I/O utilization. The correlations may be stored (e.g., in a data store) in association with an application stack. For example, entries in a persistently-stored data table may indicate that, for the application stack, a particular load balance metric percent utilization tends to be approximately 0.85 utilization of resource metric percent utilization of a particular resource. As another example, entries in a persistently-stored data table may reflect corresponding thresholds of correlated metrics. For example, a CPU utilization of 70%, which corresponds to a threshold for scaling a virtual machine group, may be stored in association with a network traffic volume of 50%. Based on these correlations, scaling policies may be created to trigger in response to network traffic volume exceeding 50% in anticipation of a spike in CPU utilization over 70%.

In 804, using the determined correlations, the system performing the process 800 may set telemetry service alarms at a telemetry service or may set other criteria to cause invocation of policies for scaling the related resources. That is, the customer may specify the utilization levels for the resources that allow the resources to handle changes in load without breaching acceptable (in the customer's view) performance thresholds while keeping resource costs within an acceptable (by the customer) range. In an example, a customer determines that virtual machine group CPU usage above 80% is unacceptably high (e.g., it causes noticeable reduction in the application stack's performance) and that relational database average I/O utilization above 65% is also unacceptably high. Based on the determined correlation, the system determines that these conditions tend to occur when network traffic volume for the application stack exceeds 695 gigabytes per second. Consequently, the system may set a telemetry service alarm for a scaling policy to scale out the virtual machine group and a telemetry service alarm for a scaling policy (to scale up the relational database) to trigger in the event that network traffic volume exceeds 695 gigabytes per second. Note that although the process 800 of FIG. 8 describes separate scaling policies executed in parallel, it is contemplated that in some implementations the breach of one alarm could cause multiple scaling actions to be performed (possibly to resources of different types). For example, given the scenario described above, the system could determine that CPU usage above 80% should trigger both to scale out a virtual machine group by a certain amount and scale up a relational database service by another amount. In some implementations, the multiple scaling actions could be specified within a single scaling policy, whereas in other implementations the multiple scaling actions may be specified in separate policies that trigger from the same telemetry service alarm.

In 806, the system performing the process 800 sets up scaling policies for the resources to be scaled. In some examples, the scaling policies may be determined based on parameter values suggested by the scaling service and/or altered or accepted by the customer, such as depicted in FIG. 5 and the process 700 of FIG. 7. In other examples, the scaling policies are dynamically generated in response to a customer target-tracking request to maintain a target metric at a particular level or between a certain range.

In 808, a first alarm set in 804 is triggered. Likewise, in 810, a second alarm set in 804 is triggered. The alarms may be triggered independently or simultaneously. Triggering the alarms causes alarm notifications to be received by a scaling service. In addition, as described in the present disclosure, the alarms may be triggered by the same or different metrics. In addition, as noted above, a single alarm may be used to trigger scaling of multiple resources. In 812, the system obtains a first scaling policy that corresponds to the first alarm. Similarly, in 814, the system obtains a second scaling policy that corresponds to the second alarm. Alternatively, scaling information about the second scaling policy maybe located in a single, or the first, scaling policy. The scaling service may invoke the scaling policies in separate threads. Based on the first scaling policy and a current capacity of the first resource, the system performing the process 800 computes a first new capacity for the first resource. Likewise, based on the second scaling policy and a current capacity of the second resource, the system computes a second new capacity for the second resource. In an implementation where scaling information for computing scaling capacities for multiple scalable resources, operations of 812 and 814 may be combined and 816 and 818 may be combined such that, upon triggering a single alarm (or in some implementations, either a first alarm or a second alarm alarm) the scaling service may invoke a single scaling policy that causes the scaling service to determine a current capacity of the first resource, computes a new capacity for the first resource, and, in tandem, determine a current capacity of the second resource and a new capacity of the second resource, all based on scaling information within a single scaling policy.

In 816, the system performing the process 800 provides the first new capacity to the first resource, thereby causing the first resource to adjust its current capacity to match the first new capacity. This thread of the system may proceed to 820, whereby the system determines whether the scaling policies executing in tandem have been successfully completed. Similarly, in 818, the system provides the second new capacity to the second resource, thereby causing the second resource to adjust its current capacity to match the second new capacity. This thread, too, may proceed to 820.

Once the system determines that both tandem scaling policies have caused their respective resources to be successfully scaled, the system performing the process 800 may proceed to 822, whereupon the scaling action is complete. The system at this stage may log the successful completion of scaling the resources. Note that one or more of the operations performed in 802-22 may be performed in various orders and combinations, including in parallel or in series. For example, some or all of the operations of 810, 814, and 818 may be performed after some or all of the operations of 808, 812, and 816, rather than in parallel.

Figure 9:
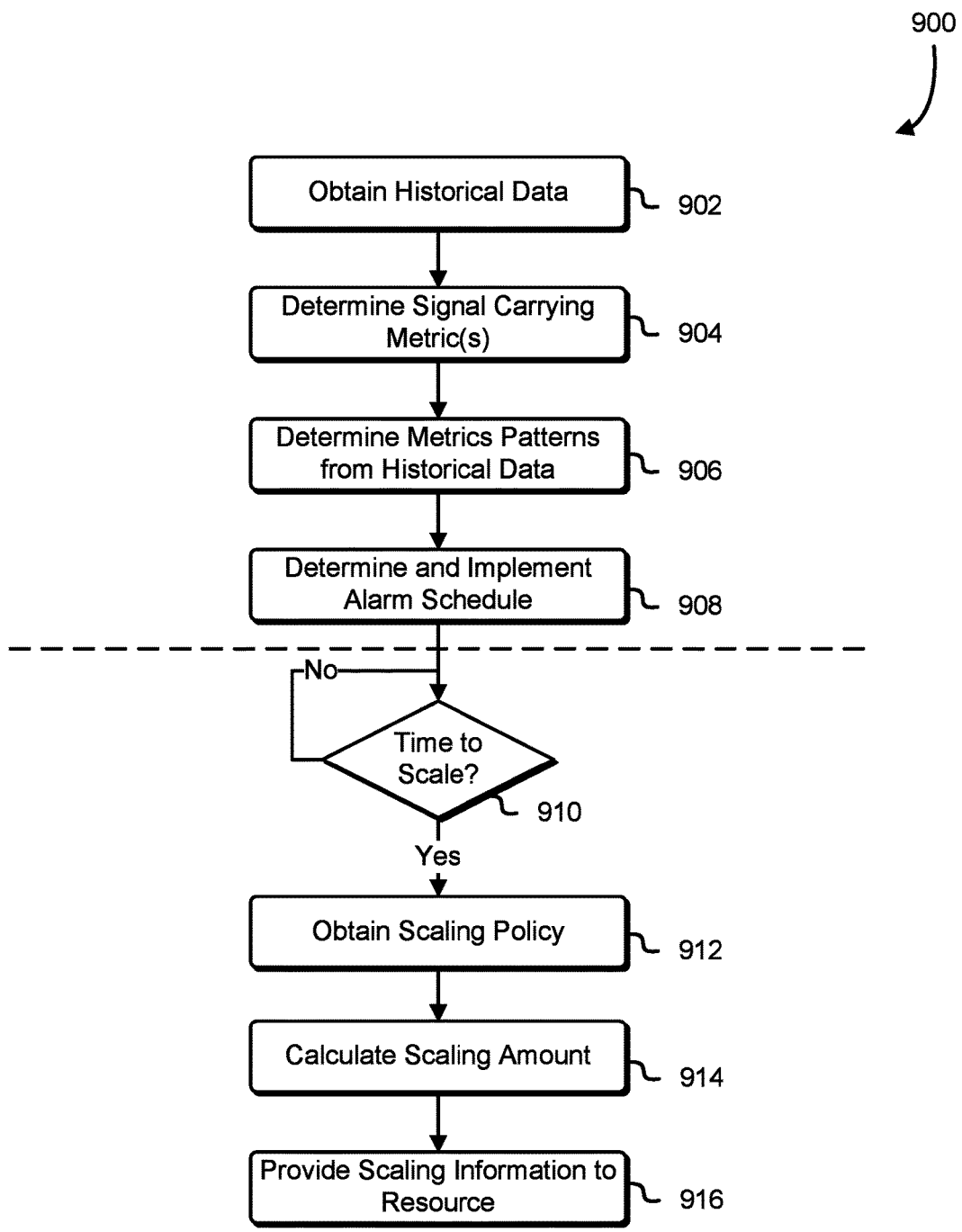
FIG. 9 is a flowchart that illustrates an example of predictive scaling in accordance with an embodiment.

FIG. 9 is a flowchart illustrating an example of a process 900 for predictive scaling in accordance with various embodiments. Some or all of the process 900 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 900 may be performed by any suitable system, such as a server in a data center, by various components of the environment 1000 described in conjunction with FIG. 10, such as the web server 1006 or the application server 1008, by multiple computing devices in a distributed system of a computing resource service provider, or by any electronic client device such as the electronic client device 1002. The process 900 includes a series of operations wherein the system analyzes historical data to determine patterns of activity, such as time-based patterns, and schedules a time in the future to perform a scaling action preemptively.

In 902, for an application stack of the customer, the system performing the process 900 obtains historical data about the application stack. For example, the system may obtain sets of measurements corresponding to various metrics tracked during a previous time period. As noted the sets of measurements may be received and stored by a telemetry service.

In 904, the system determines, from the historical data, one or more signal carrying metrics for the application stack. As noted in the present disclosure, a signal carrying metric is a metric whose measurements are affected by scaling a particular resource of the application stack and can be used as an indicator for determining that the particular resource should be scaled. For example, average CPU utilization for a virtual machine group is a measurement that is affected by scaling the virtual machine group up or down; that is, the more or fewer virtual machines in the group, the average CPU utilization, under a given load, is liable to decrease or increase respectively. Likewise, average CPU utilization may be used as an indicator to determine to scale. For example, an alarm could be set to trigger if average CPU utilization exceeded a threshold of 60%. In this example, triggering the alarm could cause the scaling service to invoke a scaling policy for increasing a number of machines in a virtual machine group, which in turn could bring the average CPU utilization down below the threshold.

In 906, the system determines patterns of measurements from the historical data of the signal carrying metrics, such as patterns over time. In one example, the system determines that there is a pattern whereby, week over week, average CPU utilization for a virtual machine group of the application stack is above a two sigma standard deviation every Thursday between 1:00 PM and 5:00 PM, and that average CPU utilization for the virtual machine group tends to drop below a two sigma standard deviation between 11:00 PM and 7:40 AM. In this example, the system also determines that an exception to the above pattern is that every December 24, average CPU utilization for the virtual machine group tends to hover around 80% for the entire day.

In 908, based on the pattern determined in 906, the system determines some preemptive scaling policies. Using the above example, the system would create scaling policies to add additional virtual machine instances to the virtual machine group and remove virtual machine instances from the virtual machine group, and schedule the former to be invoked at 1:00 PM each Thursday and the latter to be invoked at 5:00 PM each Thursday. Likewise, the system would create another scaling policy to add additional virtual machine instances to the virtual machine group and another scaling policy to remove virtual machine instances from the virtual machine group, and schedule the former to be invoked at 11:00 PM each day and the latter to be invoked at 7:40 AM each day. Finally, in the example, the system creates another scaling policy to add additional virtual machine instances to the virtual machine group and another scaling policy to remove virtual machine instances from the virtual machine group, and schedule the former to be invoked at 12:00 AM on December 24 and the latter to be invoked at 12:00 AM on December 25. The invocation may be scheduled in a variety of ways, depending on the particular implementation. For example, the invocation may be scheduled with a scheduling service that notifies, at the scheduled time, the scaling service to invoke the scaling policy. As another example, a scaling service itself may store and track scaling schedules for the application stack. In still another implementation, a telemetry service may support sending an alarm notification to invoke the scaling policy upon the occurrence of a specified event, could include scheduled events.

In 910, the system performing the process 900 determines whether, based on the schedule determined and set in 908, any of the scheduled times have been reached. If not, the system may continue to wait. The dashed line indicates that the operations of 902-08 may be performed asynchronously to the operations of 910-16. If one of the scheduled scaling times has been reached, the system may proceed to 912 whereupon the corresponding scaling policy is retrieved.

Based on the scaling policy retrieved in 912, in 914, the system calculates a scaling amount (i.e., new capacity) for the resource to be scaled. Note that in some embodiments, the system at this point obtains a current capacity of the resource to be scaled, which may affect the calculation. Note, too, that the calculation may also be affected by whether the scalable target is currently in a cooldown period; that is, whether the scalable target has been recently scaled, and some time should be given to allow the triggering metric to settle down and, therefore, the scalable target may not need to be scaled as much as if the scalable target were outside of the cooldown period.

Finally, in 916, the system provides the scaling information that includes the new capacity to the resource identified in the scaling policy, thereby causing the scalable target to be scaled. Note that one or more of the operations performed in 902-16 may be performed in various orders and combinations, including in parallel. Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1004 can include any appropriate network, including an intranet, the Internet, a cellular network, a local area network, a satellite network, or any other network and/or combination thereof. Components used for such a system can depend at least in part upon the type of network and/or environment selected. Many protocols and components for communicating via such a network are well known and will not be discussed in detail. Communication over the network 1004 can be enabled by wired or wireless connections and combinations thereof. In this example, the network 1004 includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes an application server 1008 and a data store 1010. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server 1008 can include any appropriate hardware, software, and firmware for integrating with the data store 1010 as needed to execute aspects of one or more applications for the electronic client device 1002, handling some or all of the data access and business logic for an application. The application server 1008 may provide access control services in cooperation with the data store 1010 and is able to generate content including, text, graphics, audio, video, and/or other content usable to be provided to the user, which may be served to the user by the web server 1006 in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the electronic client device 1002 to provide the content in one or more forms including, forms that are perceptible to the user audibly, visually, and/or through other senses. The handling of all requests and responses, as well as the delivery of content between the electronic client device 1002 and the application server 1008, can be handled by the web server 1006 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store 1010 may include mechanisms for storing production data 1012 and user information 1016, which can be used to serve content for the production side. The data store 1010 also is shown to include a mechanism for storing log data 1014, which can be used for reporting, analysis, or other purposes. It should be understood that there can be many other aspects that may need to be stored in the data store 1010, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 1008. In one example, a user, through a device operated by the user, might submit a search request for a certain type of item. In this case, the data store 1010 might access the user information 1016 to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the example environment 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems, and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1004 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1004. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable, and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   determining, for an application stack comprising a first resource type and a second resource type, a utilization pattern between utilization of a first resource of the first resource type and utilization of a second resource of the second resource type, the second resource type different from the first resource type, the utilization pattern associated with at least historical data for an application stack such that the historical data of a particular age is weighted relative to a time interval;

determining first criteria and second criteria based at least in part on the utilization pattern;

setting at least one alarm to trigger in response to a first usage level fulfilling the first criteria, the at least one alarm associated with a first scaling policy and a second scaling policy, where the first scaling policy includes scaling information for the first resource type and the scaling information is linked to a second scaling information for the second resource type;

receiving at least one alarm notification indicating that the at least one alarm has been triggered;

obtaining the first scaling policy and the second scaling policy;

computing a first new capacity based at least in part on the first scaling policy and a second new capacity based at least in part on the second scaling policy; and causing a resource of the first resource type to scale in accordance with the first new capacity and a resource of the second resource type to scale in accordance with the second new capacity.

2. The computer-implemented method of claim 1, wherein determining the utilization pattern includes determining that a change in demand for a resource of the first resource type affects the utilization associated with the second resource type.

3. The computer-implemented method of claim 1, wherein:
the method further comprises receiving a selection of a tracking metric and a desired range for the tracking metric; and
the first criteria and the second criteria are further determined based at least in part on the tracking metric and the desired range.

4. The computer-implemented method of claim 1, wherein the first criteria includes:
an alarm threshold for determining that the at least one alarm has been triggered; and
criteria for determining how much to scale a resource of the first resource type.

5. The computer-implemented method of claim 1, wherein:
the method further comprises selecting for a scaling plan, the scaling plan being a member of a plurality of scaling plans; and
the first criteria and the second criteria are determined based at least in part on the scaling plan selected.

6. A system, comprising:
one or more processors; and
memory including instructions that, as a result of execution by the one or more processors, cause the system to:
determine a first criteria for a first resource type of an application stack and a second criteria for a second resource type of the application stack, the application stack including a plurality of resource types, wherein at least the first resource type is different from a second resource type;
receive at least one notification when at least one of the first criteria and the second criteria are met for an application stack;
obtain at least one policy associated with the at least one notification, the at least one policy being a policy for scaling a first resource of the first resource type in relation to a second resource of the second resource type, the at least one policy including scaling information for the first resource type and the scaling information is linked to a second scaling information for the second resource type, wherein scaling of the first resource and the second resource is weighted by historical data of utilization of the first resource and the second resource such that more recent utilization is weighted more than less recent utilization;

determine, based at least in part on the at least one policy, a first capacity for the first resource and a second capacity for the second resource;

cause the first resource to be scaled according to the first capacity; and cause the second resource to be scaled according to the second capacity.

7. The system of claim 6, wherein the instructions further cause the system to determine a relationship between a usage level of the first resource corresponding to at least a usage level of the second resource in the application stack.

8. The system of claim 6, wherein the instructions further cause the system to determine the first capacity further based at least in part on a current capacity of the first resource in the application stack.

9. The system of claim 6, wherein the plurality of resource types include at least two of:
an in-memory cache,
a relational database,
a non-relational database, or
a group of virtual machines.

10. The system of claim 6, wherein the instructions further cause the system to:
receive a selection that indicates an alarm threshold value; and
configure an alarm to trigger as a result of usage measurement data reaching a value relative to the alarm threshold value; and
the at least one notification is received as a result of the alarm being triggered.

11. The system of claim 10, wherein the instructions include further instructions that cause the system to:
determine, based at least in part on an analysis of historical usage data of the application stack, a recommended alarm threshold value for the first resource type; and
provide the recommended alarm threshold value for selection in a user interface.

12. The system of claim 6, wherein the instructions include further instructions that cause the system to:
determine, based at least in part on historical usage data, a utilization pattern of resources of the first resource type;
determine, based at least in part on the utilization pattern, a future time to invoke the at least one policy; and
schedule the at least one notification to be sent at the future time; and
the instructions that cause the computer system to receive the at least one notification include instructions that cause the computer system to receive the at least one notification as a result of the at least one notification being scheduled.

13. The instructions of claim 12, wherein:
the utilization pattern indicates a likelihood of resource utilization of the first resource type to be at a certain level during a particular time period; and
the future time is a time determined for preemptively scaling one or more resources of the first resource type prior to the particular time period.

14. A non-transitory computer-readable storage medium comprising executable instructions that, as a result of being executed by one or more processors of a computer system, cause the computer system to at least:
- determine, for an application using a first resource type and a second resource type, a utilization pattern between historical utilization of the first resource type and historical utilization of the second resource type, the first resource type and the second resource type being of different types, the utilization pattern giving more weight to more recent utilization of the first resource type and utilization of the second resource type and less weight to less recent utilizations;
- determine, based at least in part on the utilization pattern, first criteria for the first resource type and second criteria for the second resource type;
- receive at least one notification indicating that criteria for determining whether to scale a first resource of the first resource type and a second resource of the second resource type has been met;
- obtain at least one scaling policy, wherein the at least one scaling policy includes scaling information for the first resource type and the scaling information is linked to a second scaling information for the second resource type;
- compute a first scaling amount and a second scaling amount based at least in part on the at least one scaling policy; and
- cause a resource of the first resource type to scale according to the first scaling amount and a resource of the second resource type to scale according to the second scaling amount.

15. The non-transitory computer-readable storage medium of claim 14, wherein the executable instructions that cause the computer system to determine the utilization pattern between utilization of the first resource type and the second resource type further include executable instructions that cause the computer system to determine the utilization pattern based at least in part on:
- an analysis of historical traffic volume data; and
- a second analysis of historical utilization of at least one of the first resource type and the second resource type.

16. The non-transitory computer-readable storage medium of claim 14, wherein the executable instructions further cause the computer system to:
- determine, based at least in part on the utilization pattern, a recommendation of the first criteria for the first resource type and a recommendation of the second criteria for the second resource type; and
- provide the recommendation to a customer.

17. The non-transitory computer-readable storage medium of claim 14, wherein:
- the executable instructions further include executable instructions that cause the computer system to receive a selection for a scaling plan, the scaling plan indicating a preference to weight scaling policy recommendations according to a particular objective of a customer; and
- the executable instructions that cause the system to provide a recommendation of first criteria and a recommendation of second criteria include instructions that cause the computer system to provide a recommendations based at least in part on the scaling plan selected.

18. The non-transitory computer-readable storage medium of claim 17, wherein the executable instructions further cause the computer system to determine, based at least in part on the particular objective of the customer, the first criteria and the second criteria.

19. The non-transitory computer-readable storage medium of claim 14, wherein the executable instructions further include executable instructions that cause the computer system to:
- receive a selection of a load metric pattern; and
- generate, based at least in part on the load metric pattern, simulated utilization measurements for the first resource type.

20. The executable instructions of claim 19, wherein the load metric pattern includes at least one of:
a step function,
a gradual ramp pattern,
an aggressive ramp pattern, or
historical load metrics.

* * * * *